(12) United States Patent
Egleston

(10) Patent No.: US 6,427,657 B1
(45) Date of Patent: Aug. 6, 2002

(54) ENGINE BALANCE APPARATUS AND ACCESSORY DRIVE DEVICE

(75) Inventor: Robert W. Egleston, Independence, KS (US)

(73) Assignee: Teledyne Technologies Incorporated, Los Angeles, CA (US)

(*) Notice: Subject to any disclaimer, the term of this patent is extended or adjusted under 35 U.S.C. 154(b) by 0 days.

(21) Appl. No.: 09/836,797

(22) Filed: Apr. 17, 2001

(51) Int. Cl.[7] ................................................. F02B 75/06
(52) U.S. Cl. ................................................... 123/192.2
(58) Field of Search ......................... 123/192.2; 74/603

(56) References Cited

U.S. PATENT DOCUMENTS

| | | | |
|---|---|---|---|
| 1,855,570 A | 4/1932 | Edison | |
| 2,426,875 A | 9/1947 | Hasbrouck et al. | |
| 2,666,418 A | 1/1954 | Garnier et al. | |
| 3,402,707 A | 9/1968 | Heron | |
| 3,415,237 A | 12/1968 | Harkness | |
| 3,581,628 A | 6/1971 | Williams | |
| 3,667,317 A | 6/1972 | Hillingrathner | |
| 4,320,671 A | 3/1982 | Curasi | |
| 4,538,481 A | 9/1985 | Ohta et al. | |
| 4,632,072 A | 12/1986 | Brogdon | |
| 6,164,259 A | 12/2000 | Brogdon et al. | |

Primary Examiner—Noah P. Kamen
(74) Attorney, Agent, or Firm—Kirkpatrick & Lockhart LLP

(57) ABSTRACT

A balancing mechanism for an engine that has a rotating crankshaft and reciprocating pistons. The balancing mechanism comprises a primary balance mass assembly non-rotatably and removably affixed to the crankshaft. The primary mass assembly comprises a primary mass affixed to a primary hub portion and a primary cap portion removably affixed to the primary hub portion to clamp a portion of the crankshaft therebetween. A secondary balance mass assembly may be rotatably and removably supported on the crankshaft. A driver assembly is affixed to the crankshaft to cause the secondary balance mass to rotate in a direction that is opposite to the direction in which the crank shaft is rotating. The driver assembly may include auxiliary gears configured to transport rotary power to auxiliary components. The gears are readily detachable from the apparatus to facilitate inspection and repair operations.

20 Claims, 16 Drawing Sheets

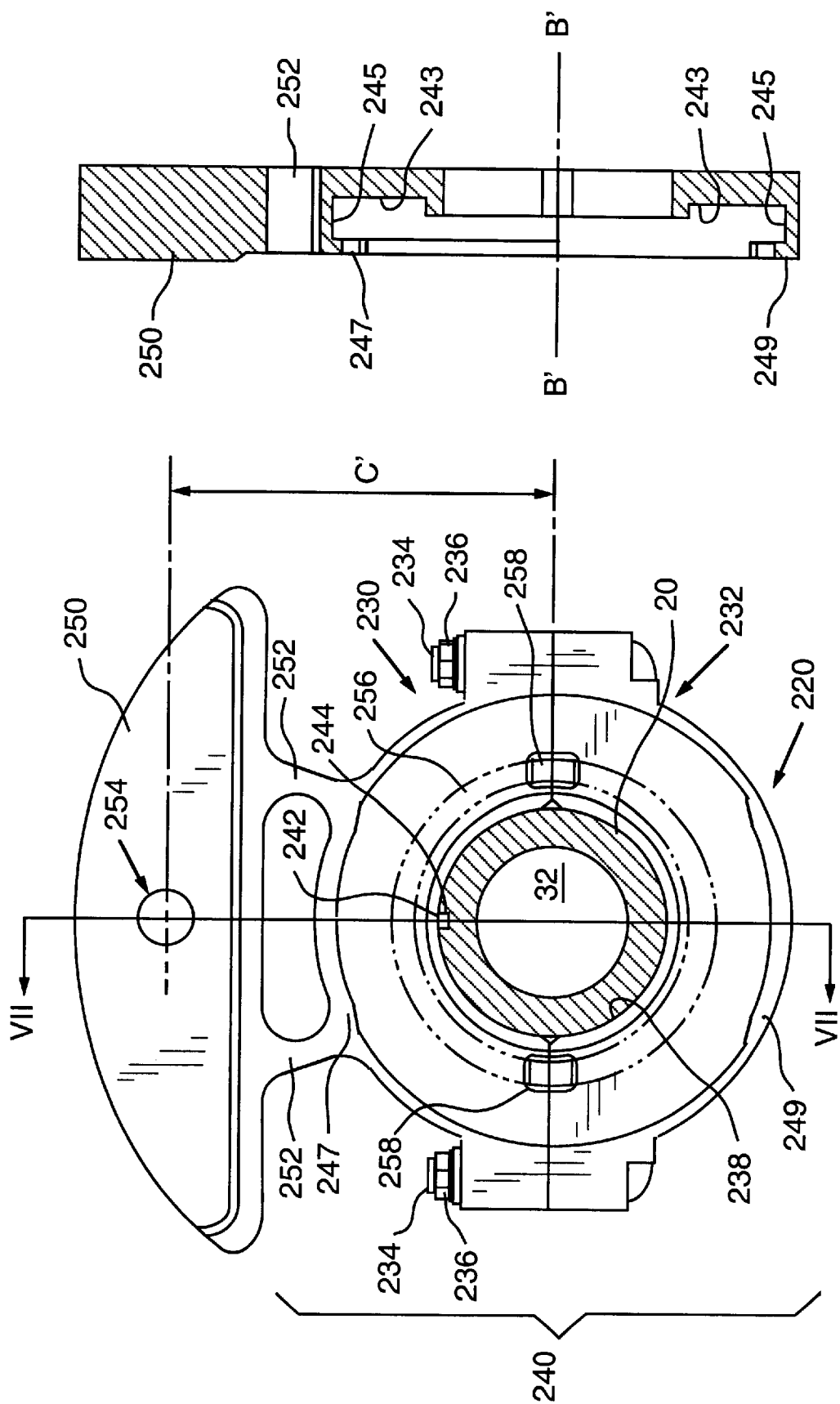

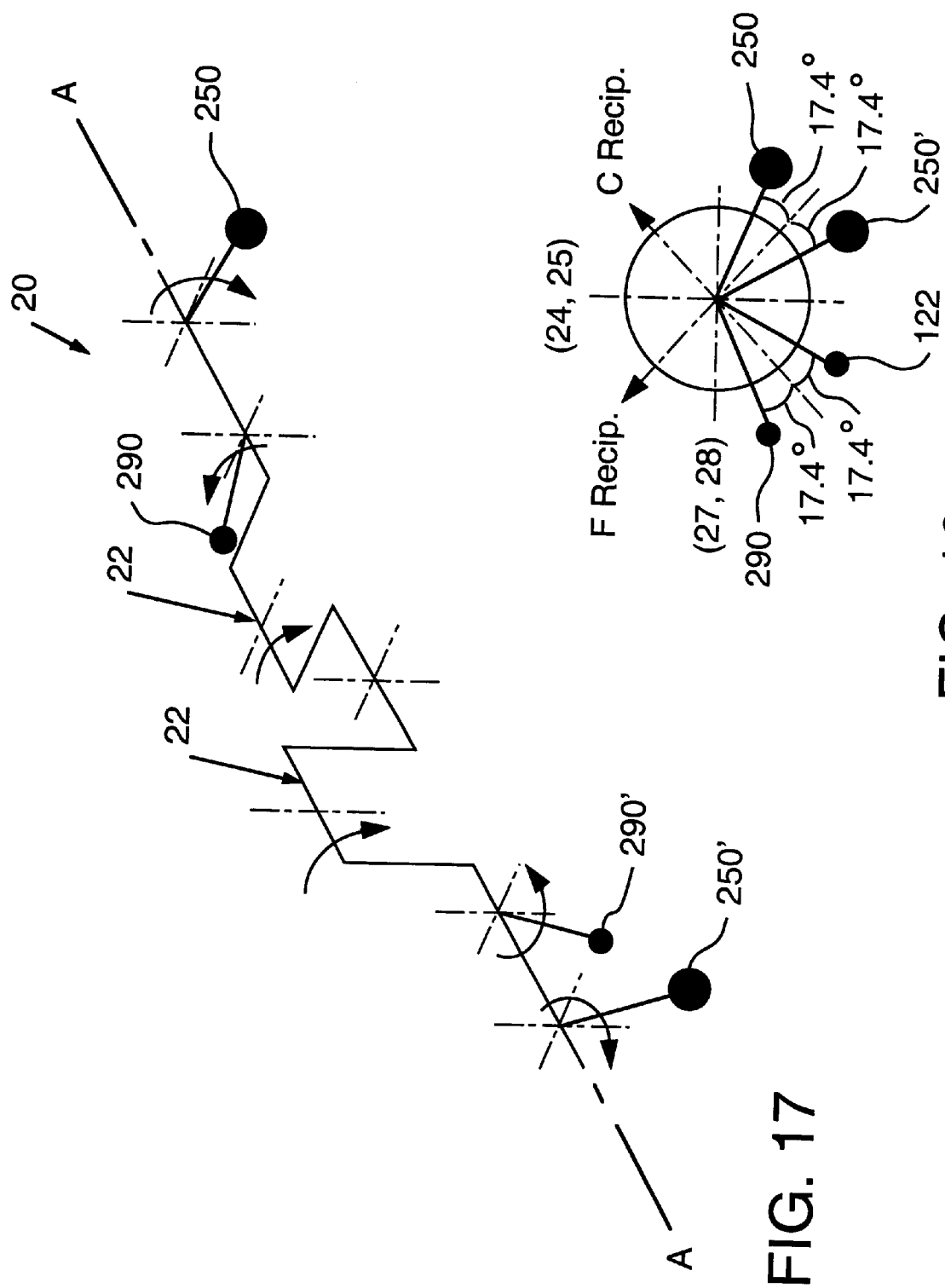

ENGINE BALANCE APPARATUS AND ACCESSORY DRIVE DEVICE

FEDERALLY SPONSORED RESEARCH

Certain of the research leading to the present invention was sponsored by the United States Government under National Aeronautics and Space Administration (NASA) Cooperative Agreement No. NCC3-515. The United States Government may have certain rights in this invention.

BACKGROUND OF THE INVENTION

FIELD OF THE INVENTION

The subject invention relates to engines and, more particularly, to apparatus for countering unbalanced forces generated in engines and harnessing power from an engine's crankshaft to drive accessory apparatuses.

DESCRIPTION OF THE INVENTION BACKGROUND

Over the years, perhaps due to declining fossil fuel reserves and other economic factors, designers have been challenged to develop engines that are lighter and compact, more fuel efficient, more reliable, and easier to maintain than prior engines. To address such challenges, engine designers must develop new solutions to old problems that have confronted engine designers for years. One such problem involves the need to minimize vibrations created during the engine's cycle. This need almost universally encompasses all types of engine designs the engine's cycle. This need almost universally encompasses all types of engine designs regardless of their specific applications and tends to be very important in most, if not all, engines that employ reciprocating pistons.

Within an engine structure, forces are created by the inertia of their moving parts and by the varying gas pressures in the engine cylinders. Such forces tend to result in deflections in the structural members of the engine. Thus, vibrations of varying amplitudes and frequencies are developed throughout the engine structure and are transmitted to a support frame through the engine mounts and ultimately to various other components attached to the frame. These vibratory motions must be controlled to avoid malfunction, mechanical failure and/or excessive engine noise.

Piston reciprocation is one of the main causes of engine vibration. Each piston has a mass and inertia and, as it reciprocates within a cylinder, it applies a force to the engine structure that lies along the cylinder axis. One method employed in the past to counterbalance such piston forces involved adding a counterweight to the crankshaft to provide an inertia force in a direction that is opposite to the direction of the piston force. However, the use of such counterweights alone proved to be an ineffective method for balancing the inertia forces generated by the piston, because the counterweights themselves created additional unbalanced forces during rotation of the crankshaft.

Thus, various other counterbalance configurations have been developed in an effort to address those shortcomings. One prior method involved the use of counter-rotating counterbalances that were timed and so proportioned such that the components of their centrifugal forces in a first direction resulting from their rotation would be additive and in opposition to the piston forces to achieve a desired balance, while the components of their centrifugal forces in a second direction would be in opposition to each other so as to cancel each other out. However, the components and drive arrangements for effecting such counter-rotation of counterweights typically occupied a significant amount of space within the engine and can add undesirable weight to the engine.

U.S. Pat. No. 3,415,237 to Harkness purported to solve the above-mentioned problems associated with driving counterbalances within a single cylinder four stroke engine. That patent teaches that counterweights located external to the engine crankcase are driven through a gear arrangement attached to the camshaft. However, such arrangement was not particularly well-suited for use in multiple cylinder engines.

The designers of multiple cylinder engines must also attempt to compensate for forces known as "couples" that are generated during the combustion cycles. A couple comprises forces that want to turn the engine about its vertical axis. In multiple cylinder engines, it is desirable for the pistons in one engine bay to not reach the top of their respective strokes at the same time that the pistons in an adjacent bay are reaching their respective top strokes. If they do, engine vibration may be exacerbated. Thus, multiple cylinder engines are designed to achieve "even firing" between the cylinders. However, because the pistons create forces in different directions and because the axes along which those forces lie are separated from each other (i.e., not coaxial), couples are generated which, if left unbalanced or uncountered can lead to more engine vibration.

U.S. Pat. No. 4,632,072 to Brogdon discloses a balancing arrangement for a multiple cylinder combustion engine. In that engine, a pinion gear is coaxially attached to each axial end of the crankshaft. Each pinion gear includes a counterweight that is radially spaced from the crankshaft axis of rotation. At least one idler pinion gear is rotatably mounted to the engine housing and is in meshing engagement with one of the pinion gears attached to the crankshaft. Each idler pinion includes a weighted portion spaced from its axis of rotation. Both the counterweights and the weighted portions of the idler pinions are angularly spaced from each other by a predetermined amount so that, during rotation of the crankshaft, the centrifugal force vectors of the crankshaft counterweight and idler pinion weighted portions cancel the primary moment (couple) generated by the piston reciprocation acting on axially spaced positions along the crankshaft.

Still other arrangements have been devised to address engine vibration. For example, U.S. Pat. No. 1,855,570 to Edison, U.S. Pat. No. 2,426,875 to Hasbrouk et al., U.S. Pat. No. 2,666,418 to Gamier et al., U.S. Pat. No. 3,402,707 to Heron, U.S. Pat. No. 3,581,628 to Williams, and U.S. Pat. No. 3,667,317 to Hillingrathner disclose various means for controlling engine vibration.

Also in most modem day engine configurations and applications, a variety of ancillary components that require some form of power to function are employed. For example, many engine applications require the use of hydraulic pumps, vacuum pumps, fans, etc. Thus, it is desirable to obtain as much of that power from the engine itself, if it can be done without noticeably effecting the engine's output. While various ancillary drive schemes, such as belts and pulleys have been employed, they are not well-suited for use in applications wherein minimization of engine size and engine weight is an important consideration.

Perhaps no industry has experienced the above-mentioned challenges more so than the aircraft industry. It is axiomatic that it is particularly desirable to have a small, lightweight, fuel efficient aircraft engine that is reliable and can be readily maintained. However, the various methods discussed above do not lend themselves well for use in such applications wherein engine size, weight and reliability may be crucial.

The engine balance apparatuses and accessory drive devices that are disclosed in U.S. Pat. No. 6,164,259 to Brogdon et al. address the above-mentioned shortcomings. In applications wherein frequent inspection is required and to reduce downtime associated with inspecting and replacing the components of such apparatus, it is desirable that such devices be easily removable and replaceable.

Thus, there is a need for an apparatus for effectively reducing engine vibration and counterbalancing forces generated within an engine that has components that may be easily detached and replaced as necessary.

There is still another need for apparatus having the above-mentioned characteristics and that is relatively compact and adds little weight to the engine when compared to prior engine balance arrangements.

Another need exists for apparatus with the above characteristics that does not require the numerous parts commonly associated with prior engine balance schemes.

Yet another need exists for the above-mentioned apparatus that is rugged and reliable and serves to transfer the thrust loads from the crankshaft to the gear assembly.

SUMMARY OF THE INVENTION

In accordance with a particularly preferred form of the present invention, there is provided a balancing apparatus for an engine having a rotating crankshaft that has a crankshaft axis. In a preferred form, the balancing apparatus includes a primary balance mass assembly that is non-rotatably and removably affixed to the crankshaft and a secondary balance mass assembly that is rotatably and removably supported on the crankshaft. In addition, a driver is attached to the crankshaft for causing the secondary balance mass assembly to rotate in a direction opposite to the direction of rotation of the crankshaft. The primary balance mass assembly includes a primary mass that is affixed to a primary hub portion and a primary cap portion that is removably attached to the primary hub portion to clamp a portion of the crankshaft therebetween and define a primary balance mass carrier. The apparatus may also include a secondary mass that is affixed to a secondary hub portion and a secondary cap portion that is removably attached to the secondary hub portion to define a secondary hole therebetween to rotatably receive another portion of the crankshaft therein. The secondary cap and secondary hub portions serve to define a second balance mass carrier.

The apparatus may include a primary gear removably and non-rotatably supported on the primary balance mass carrier and a secondary gear removably and non-rotatably supported on the secondary balance mass carrier. The secondary gear communicates with the primary gear such that rotation of the crankshaft in a first direction causes the secondary gear and the secondary balance mass carrier to rotate about the crankshaft in a secondary rotational direction opposite to the primary rotational direction.

The present invention may also comprise an engine balance mechanism that includes a crankshaft that defines a shaft axis and a primary balance mass carrier that is removably and non-rotatably attached to the crankshaft. The primary balance mass carrier has a primary balance mass thereon. The mechanism may further include a secondary balance mass carrier that is rotatably and removably received on the crankshaft. The secondary balance mass carrier has a secondary balance mass thereon. A primary gear is removably supported on the primary balance mass carrier and a secondary gear is removably supported on the secondary balance mass carrier. At least one auxiliary gear is in intermeshing engagement with the primary and secondary gears and a gear cage is coaxially supported on the crankshaft and supports auxiliary gears therein.

It is a feature of the present invention is to provide an engine balance mechanism that is readily detachable from the engine crankshaft to facilitate inspection and repair operations.

Accordingly, the present invention provides solutions to the shortcomings of prior engine balancing mechanisms and schemes. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein:

FIG. 6 is an end view of a primary balance mass assembly of the drive assembly of FIG. 5 showing the crankshaft in cross-section;

FIG. 7 is a cross-sectional view of the primary balance mass assembly of FIG. 6 taken along line VII—VII in FIG. 6 with the crankshaft omitted for clarity;

FIG. 17 is a graphical depiction of the positioning of the balance masses of the present invention along a rotating crankshaft;

FIG. 18 is another graphical depiction of the instantaneous positions of the balance masses of the present invention about a rotating crankshaft axis;

DETAILED DESCRIPTION OF THE PREFERRED EMBODIMENTS

Figure 1:
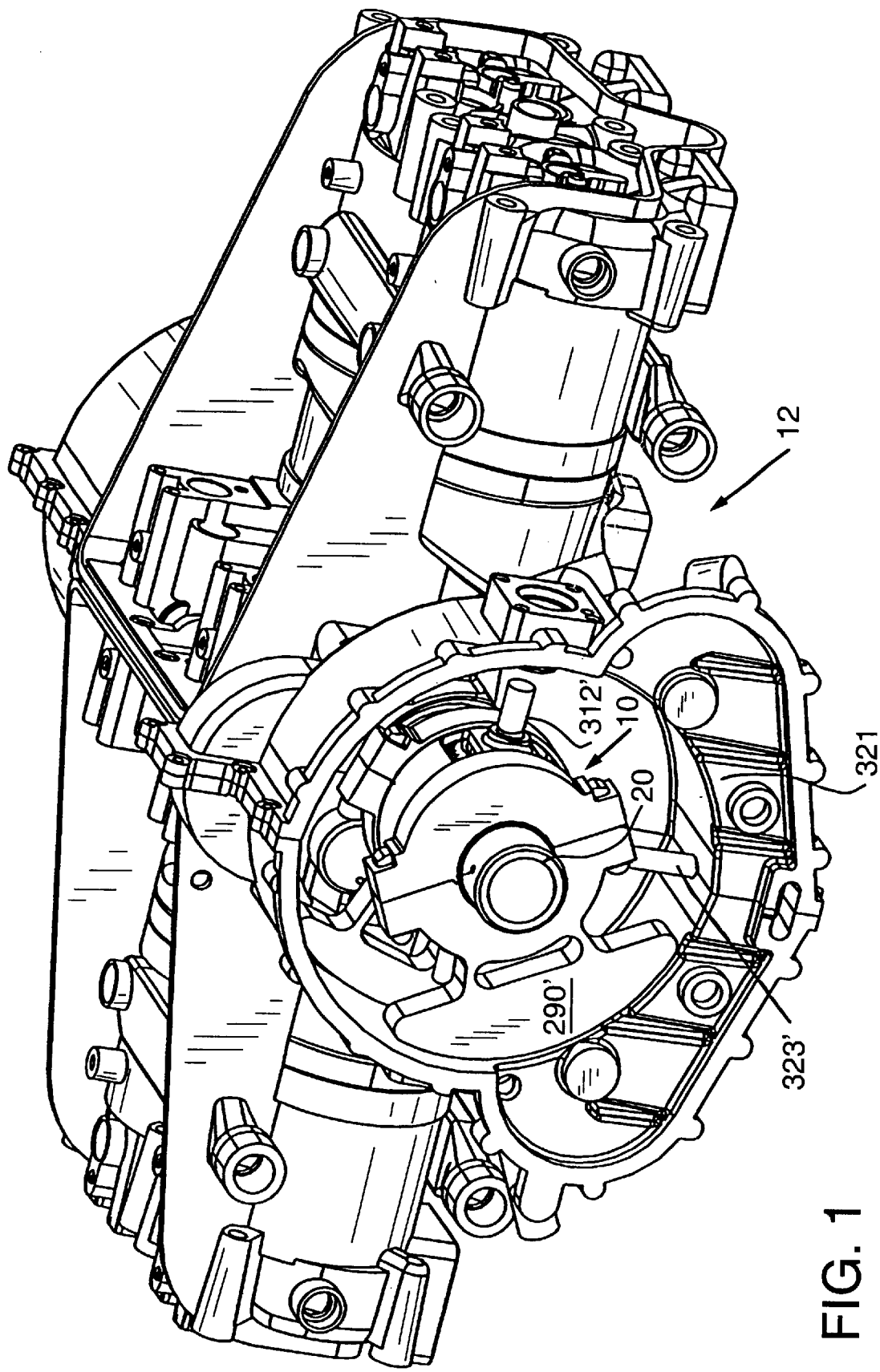
FIG. 1 is a perspective view of a four cylinder, two stroke, horizontally opposed engine with the balancing apparatus of the present invention installed therein.

Referring now to the drawings for the purposes of illustrating the present preferred embodiments of the invention only and not for the purposes of limiting the same there is shown an engine balance mechanism 10 that is adapted to be advantageously used to balance various internal forces generated in an engine 12. While the engine balance mechanisms 10 of the present invention are particularly well-suited for use in connection with horizontally opposed, four cylinder, two stroke aircraft engines of the type depicted in FIG. 1, the skilled artisan will appreciate that the subject invention may be advantageously employed in connection with a variety of other engines, such as, for example, two stroke engines with less than twelve cylinders and four stroke engines with less than six cylinders. Moreover, the subject invention can work in a variety of different engine configurations used in, for example, automobiles, aircrafts, boats, stationary compressors, etc. It is conceivable that the subject invention could provide advantageous results in any engine employing a rotating shaft and reciprocating pistons. Thus, the scope of protection afforded to the subject invention should not be limited solely to engines of the type depicted in FIG. 1.

Figure 2:
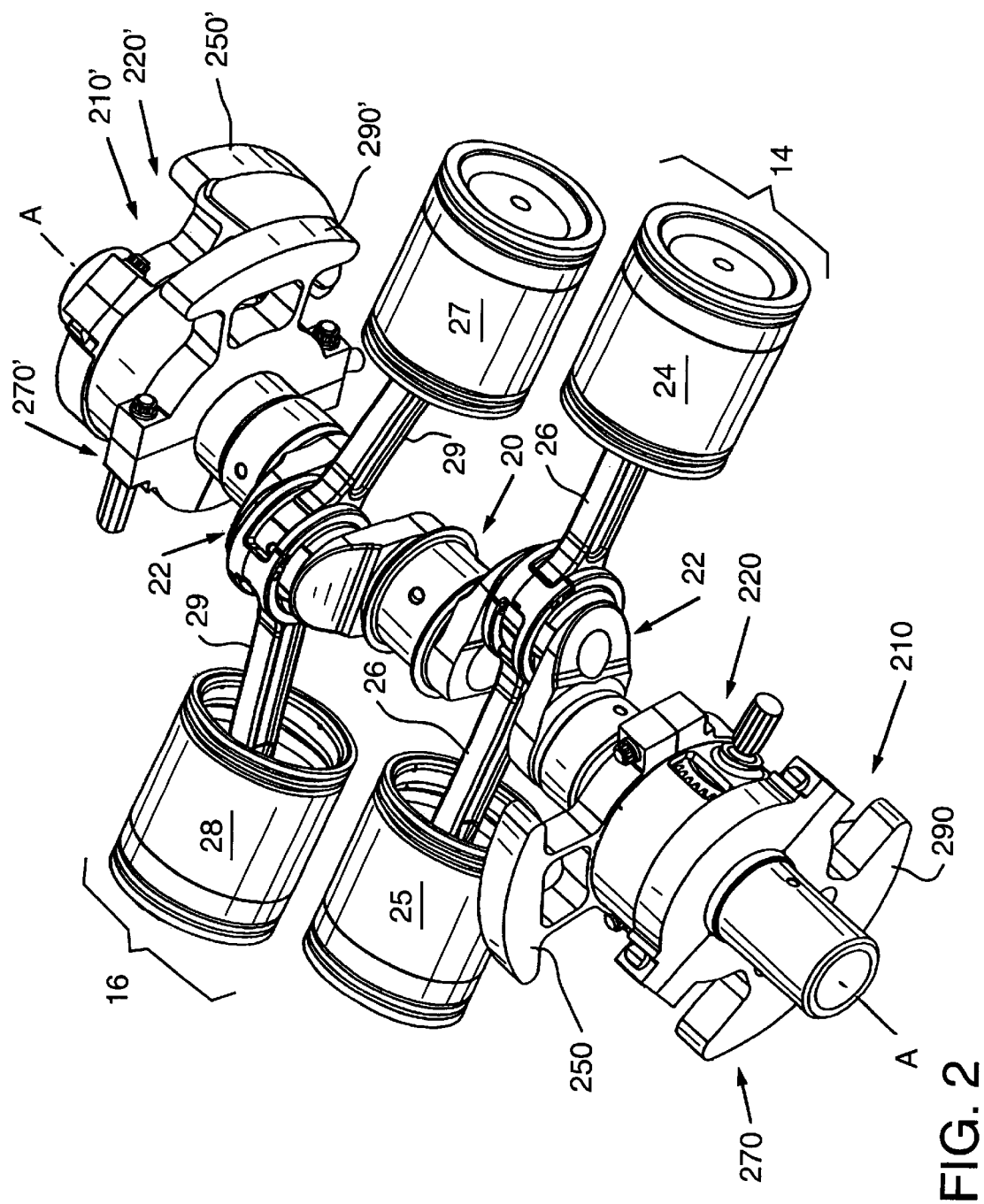
FIG. 2 is a perspective view of the balancing apparatus of the present invention attached to the crankshaft of the engine depicted in FIG. 1.

More particularly and with reference to FIG. 2, there is shown a preferred balance mechanism 10 of the present invention for use in connection with a crankshaft 20 of an engine 12. It will be understood that crankshaft 20 is rotatably supported within the engine 12 in a known manner for rotation about a crankshaft axis A—A. Crankshaft 20 may be machined, forged, or cast from steel or other suitable material in a configuration shown in FIGS. 3 and 4. In this embodiment, crankshaft 20 has two crankpins 22 that are radially offset from axis A—A. The skilled artisan will further understand that engine 12 has two "bays" (14, 16) of pistons. For the purposes of this description, the first bay 14 has a first piston 24 and a second piston 25. Pistons (24, 25) may be mechanically fastened to the corresponding crankpin 22 by conventional connecting rods 26. Likewise, the second bay 16 has a first piston 27 and a second piston 28 that are fastened to the corresponding crankpin 22 by conventional connecting rods 29. See FIG. 2. It will be understood that pistons (24, 25, 27, 28) lie in the same plane.

Crankshaft 20 further has a first end 30, a central portion 50 and a second end 60. The first end 30 may have a coaxially aligned lubrication passage 32 therethrough and a series of journal portions (34, 36, 38, 40) formed thereon. A radially extending lubrication port 35 may be provided through the journal portion 34 and another radially extending lubrication port 37 may be provided through the journal portion 36. Likewise, another radially extending lubrication port 41 may be provided through the journal 40.

Figure 3:
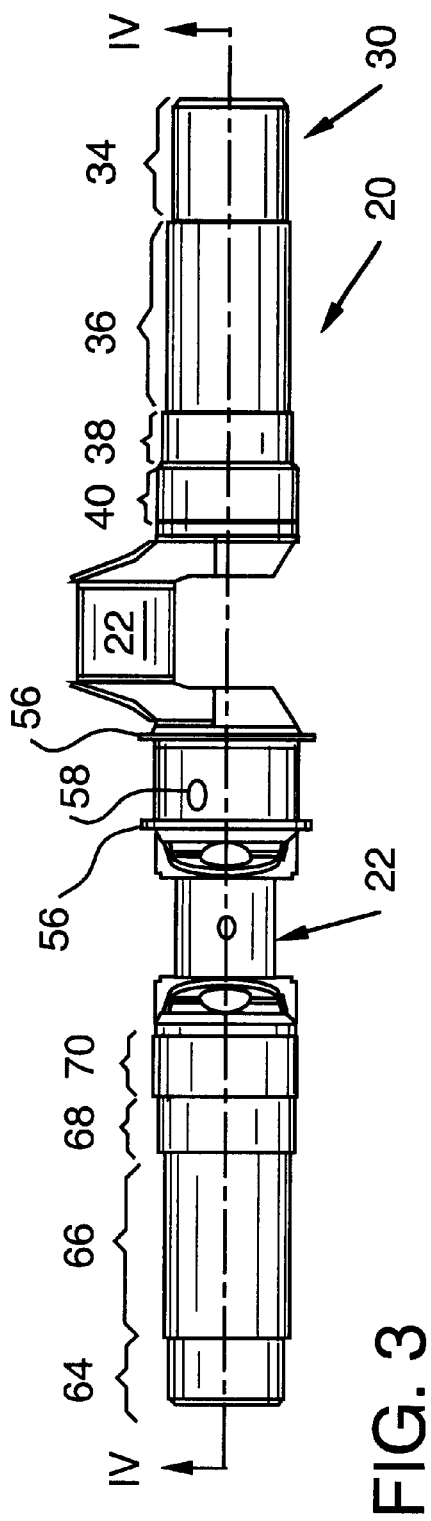
FIG. 3 is a side view of the crankshaft depicted in FIG. 2.
Figure 4:
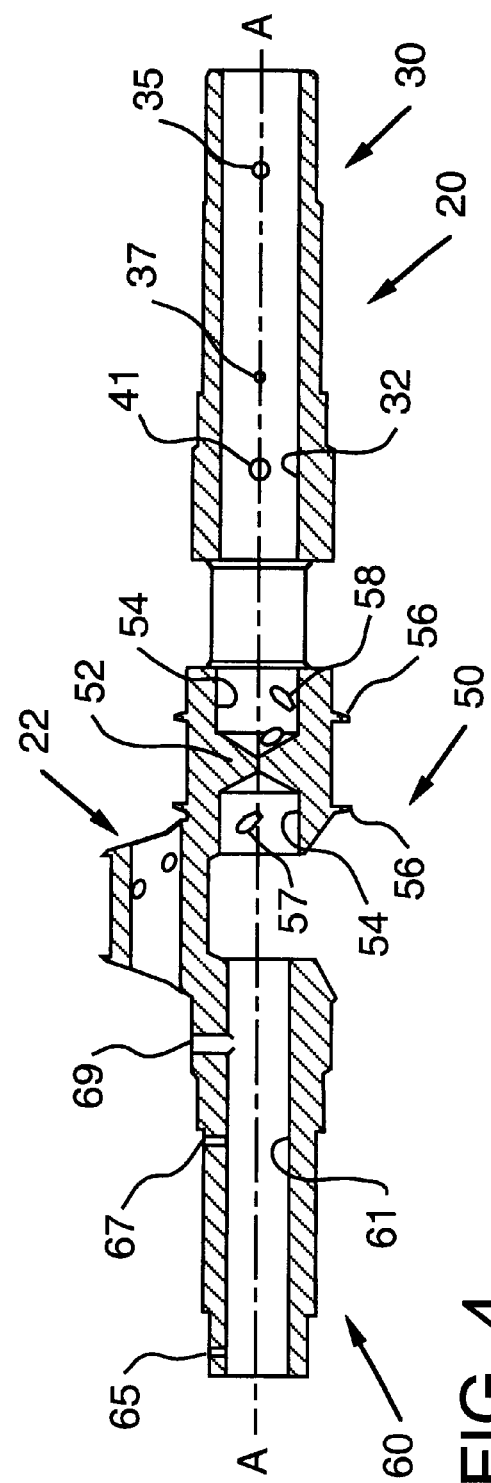
FIG. 4 is a cross-sectional view of the crankshaft of FIG. 3, taken along line IV—IV in FIG. 3.
Figure 5:
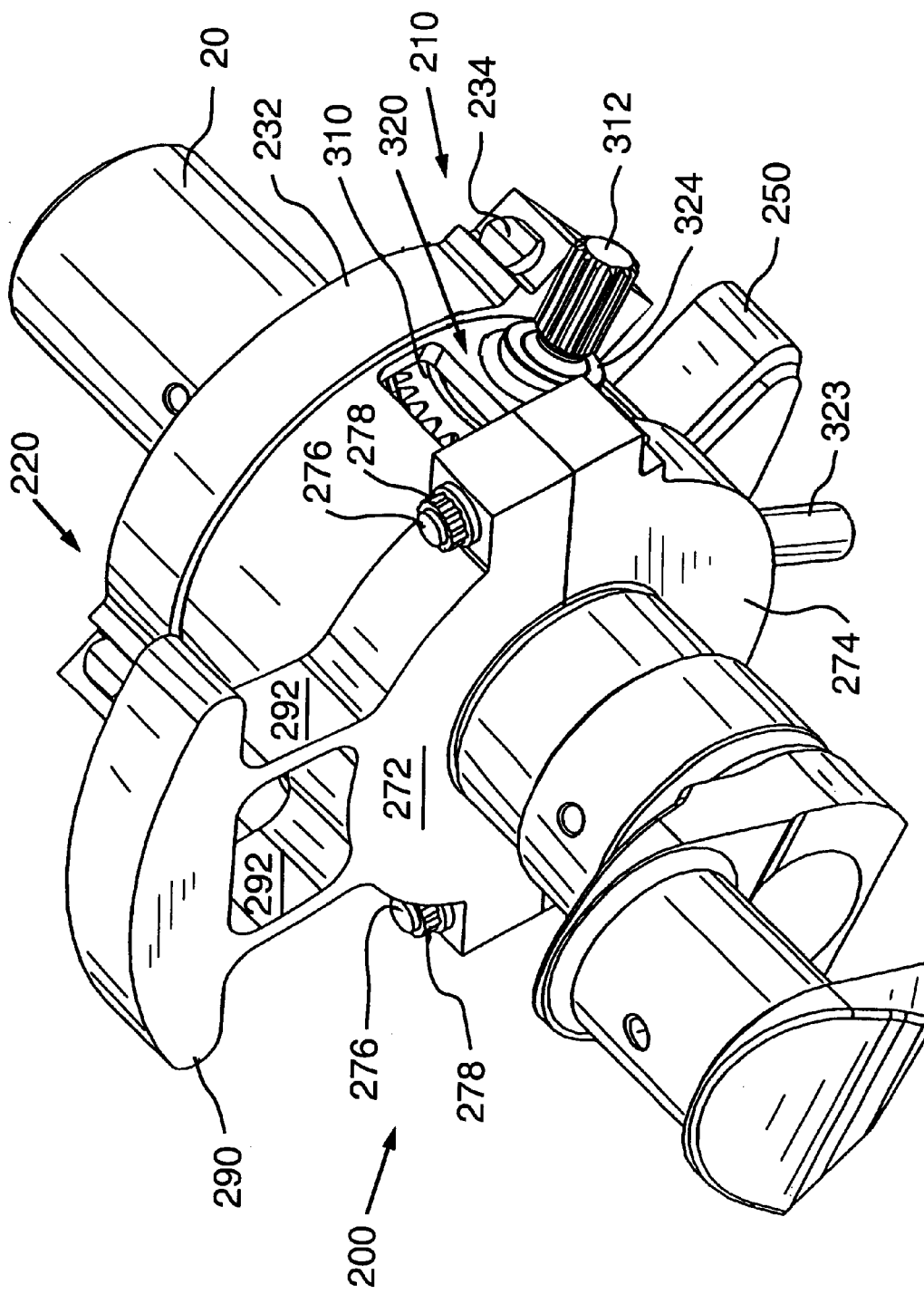
FIG. 5 is a partial perspective view of an "fore" drive assembly attached to an engine crankshaft.

As can be seen in FIG. 4, the central portion 50 may include a solid center area 52 and have two coaxially aligned bores 54 therein. Radial shoulders 56 may also be formed around the outer surface of the center portion 50. A first radially extending lubrication port 57 may be provided through the central portion 50 into the passage 32 and a second radially extending lubrication port 58 may be provided through the central portion 50 into a passage 62 within the second end 60. As can be seen in FIGS. 3 and 4, the second end 60 of crankshaft 20 may have a series of journals (64, 66, 68, 70) thereon and a lubrication passage 61 therethrough. In addition, a radially extending lubrication port 65 may be provided through journal 64 and another lubrication port 67 may be provided through the journal 66. Yet another radially extending lubrication port 69 may be provided through journal 70.

In the embodiment depicted in FIG. 2, an "aft" balance mass "driver" or drive assembly 210' and a "fore" balance mass driver assembly 210 are attached to the crankshaft 20. It will of course be understood that the aft drive assembly is attached in proximity to the rear end of the crankshaft and the "fore" drive assembly 210 is attached in proximity to the front end of the crankshaft. Those of ordinary skill in the art will appreciate, however, that the drive assemblies (210, 210') may be advantageously attached to any suitable point along the length of the crankshaft. The construction and operation of the fore drive assembly 210 will now be described. The reader will appreciate that the "aft" drive assembly 210' is preferably identical to the fore drive assembly 210 and, therefore, an appreciation of its construction and operation can be gleaned from the following discussion concerning the fore drive assembly 210. The elements of the aft drive assembly 210' are identical to the elements of the fore drive assembly 210. The elements of the aft drive assembly 210' will be identified in the drawings herein with the same element numbers describing the elements of the fore drive assembly 210 and with "'" symbol.

The drive assembly 210 includes a primary balance mass assembly 220 that is non-rotatably and removably affixed to the journal 36 of the crankshaft 20. The primary balance mass assembly 220 may be fabricated from steel or other suitable material and includes primary hub portion 230 and a primary cap portion 232 that are removably interconnectable to form a primary balance mass carrier, generally designated as 240. See FIG. 6. As can be seen in FIG. 6, the primary hub portion 230 may be removably affixed to the primary cap portion 232 by, for example, mechanical fasteners such as bolts 234 and nuts 236. When attached together as shown in FIG. 6, the primary hub portion 230 and the primary cap portion 232 define a hole 238 in the primary balance mass carrier 240 for receiving a portion of crankshaft journal 36 therein. Hole 238 is sized relative to the journal 36 such that an interference fit is established between the primary balance mass carrier 240 and the journal portion 36 of the crankshaft 20. To locate the primary balance mass assembly 220 in a desired location, a key-receiving slot 242 may be provided in either of the primary hub portion 230 or the primary cap portion 232 for receiving a woodruff key 244 protruding from the journal portion of the crankshaft 20. The skilled artisan will readily appreciate that such arrangement permits the primary balance mass assembly 220 to be rigidly or non-rotatably affixed to the crankshaft 20, yet it can be easily removed for maintenance and repair purposes.

As can be seen in FIGS. 6 and 7, a primary balance mass 250 is radially spaced apart from the primary hub portion 230 by arms 252. Primary balance mass 250 has a center of gravity (designated as 254 in FIG. 6) that is a predetermined distance "C'" from the axis B'—B' (and axis A—A when the primary balance mass assembly 220 is coaxially affixed to the journal 36 of the crankshaft 20). The primary hub portion 230, the primary balance mass 250, and arms 252 may be integrally formed from one piece of material. Those of ordinary skill in the art will also appreciate that the primary balance mass 250 may be provided in a variety of different shapes and weights.

Figure 8:
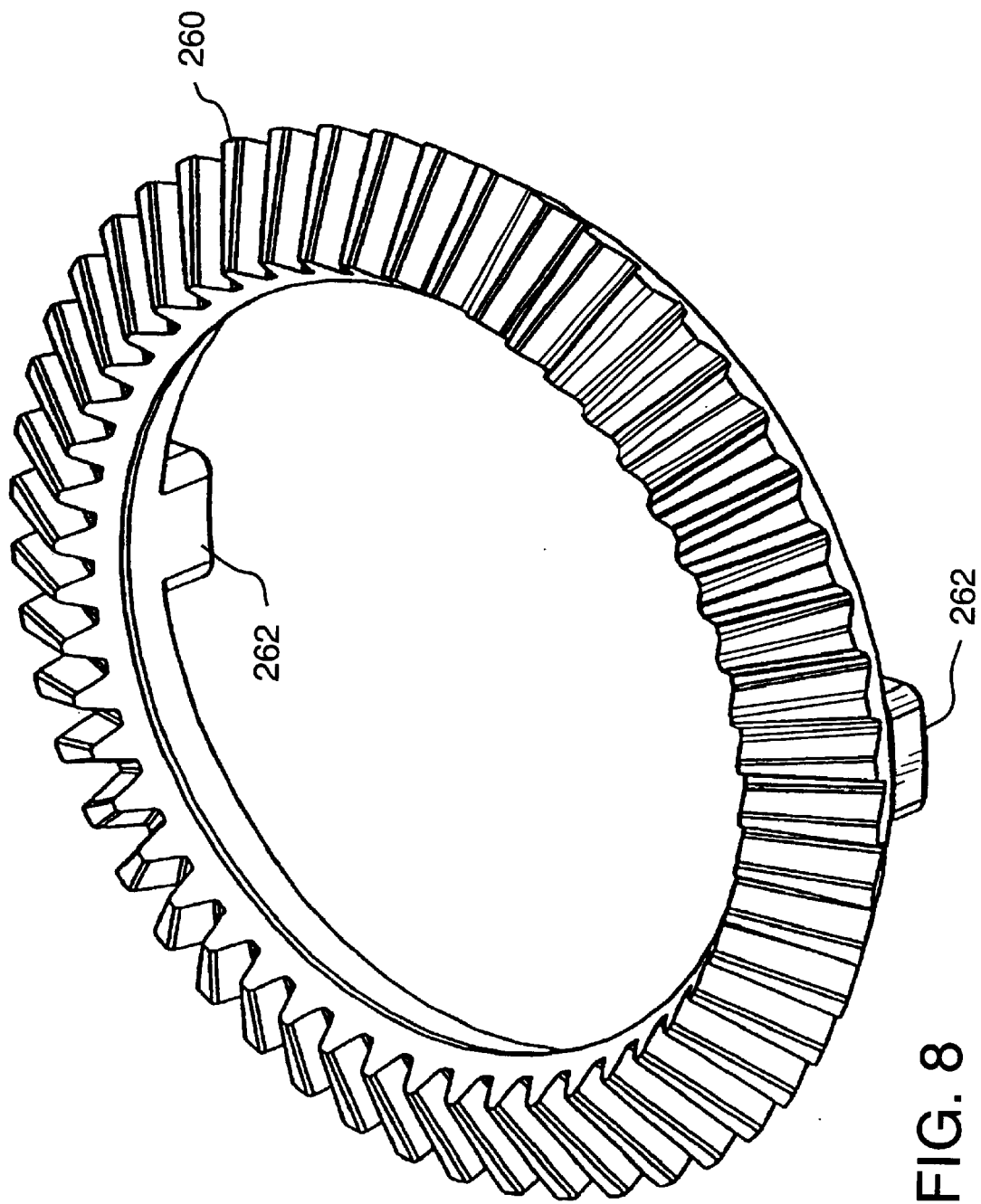
FIG. 8 is a perspective view of a primary gear of the drive assembly of FIG. 5.

As can also be seen in FIG. 6, the primary bearing cap 240 has a bearing surface 256 for receiving a primary driver bevel gear 260. To facilitate easy replacement of the primary driver bevel gear 260, the primary driver bevel gear 260 is removably supported on the primary bearing cap 240 by a pair of outwardly protruding tabs 262 that are formed on the rear surface of the primary driver bevel gear 260. See FIG. 8. As can be seen in FIG. 6, a pair of cavities 258 are provided in the primary bearing cap 240 for receiving the tabs 262 therein. The reader will appreciate that such arrangement permits the primary driver bevel gear 260 to be readily detached from the primary bearing cap 240, yet the primary driver bevel gear 260 is non-rotatably supported by the primary bearing cap 240 such that it rotates therewith as the primary bearing cap 240 rotates with the crankshaft 20.

Figure 9:
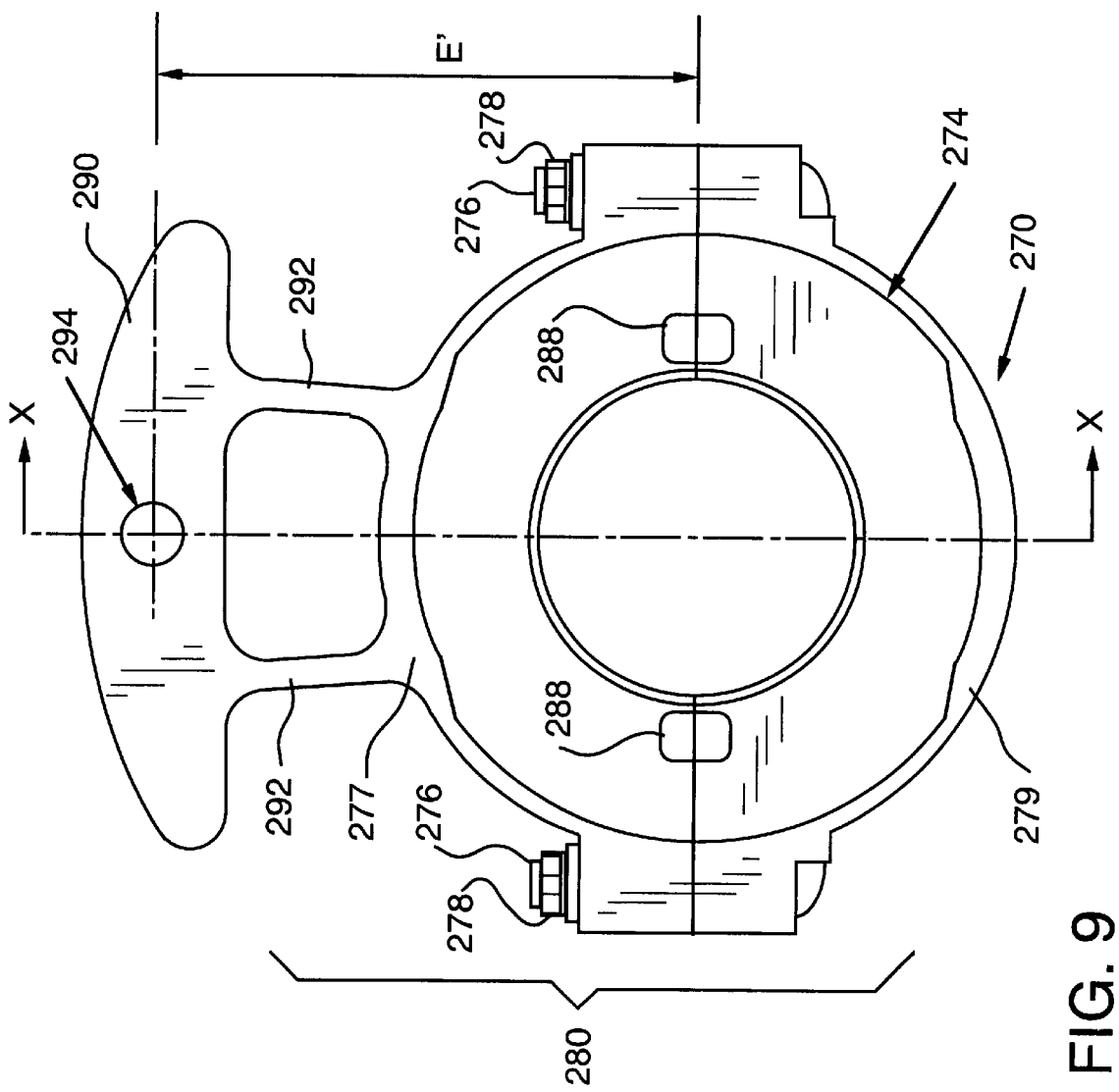
FIG. 9 is an end view of a secondary balance mass assembly of the embodiment of FIG. 5.
Figure 14:
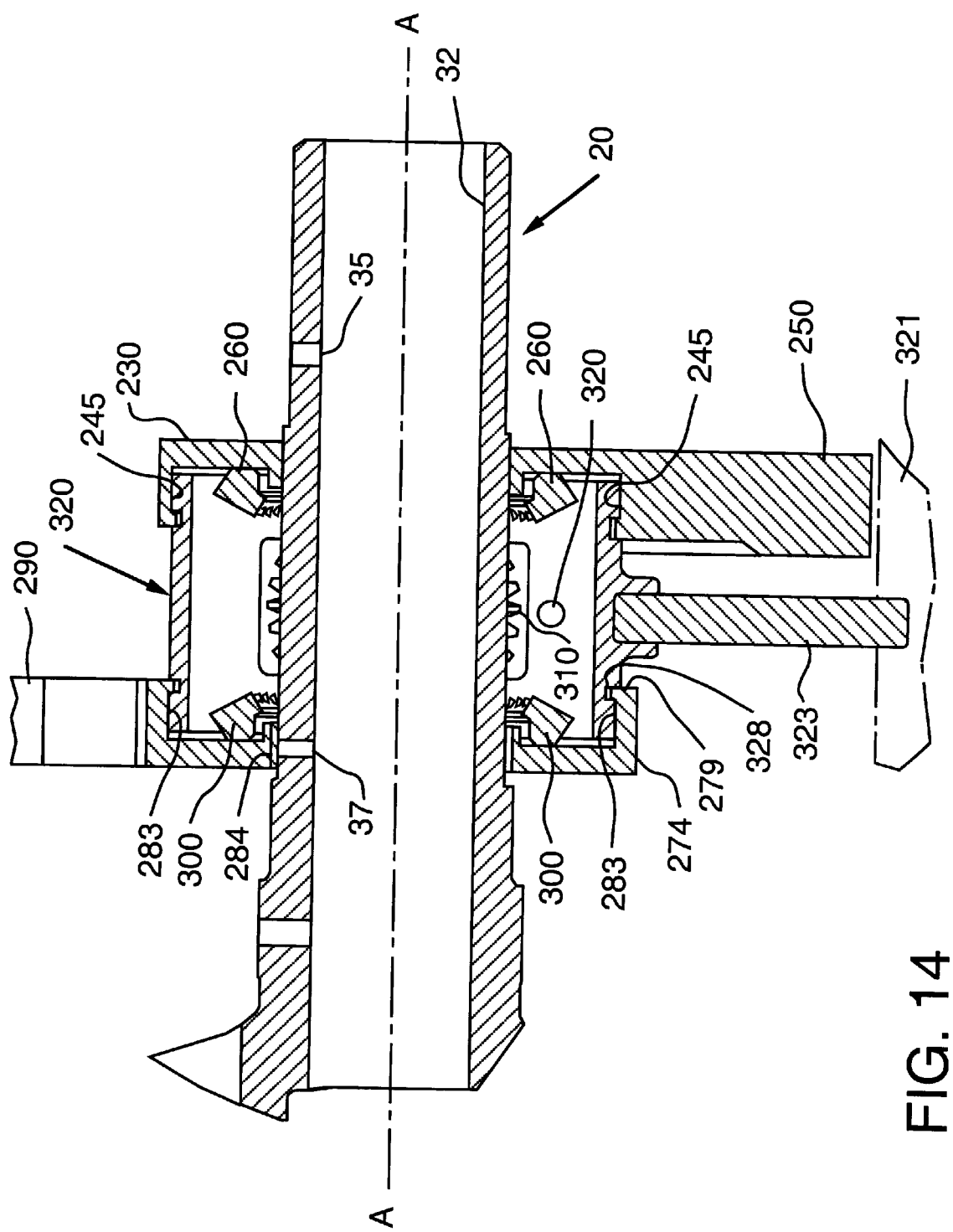
FIG. 14 is another cross-sectional view of the drive assembly of FIGS. 12 and 13 taken along line XIV—XIV of FIG. 12.
Figure 15:
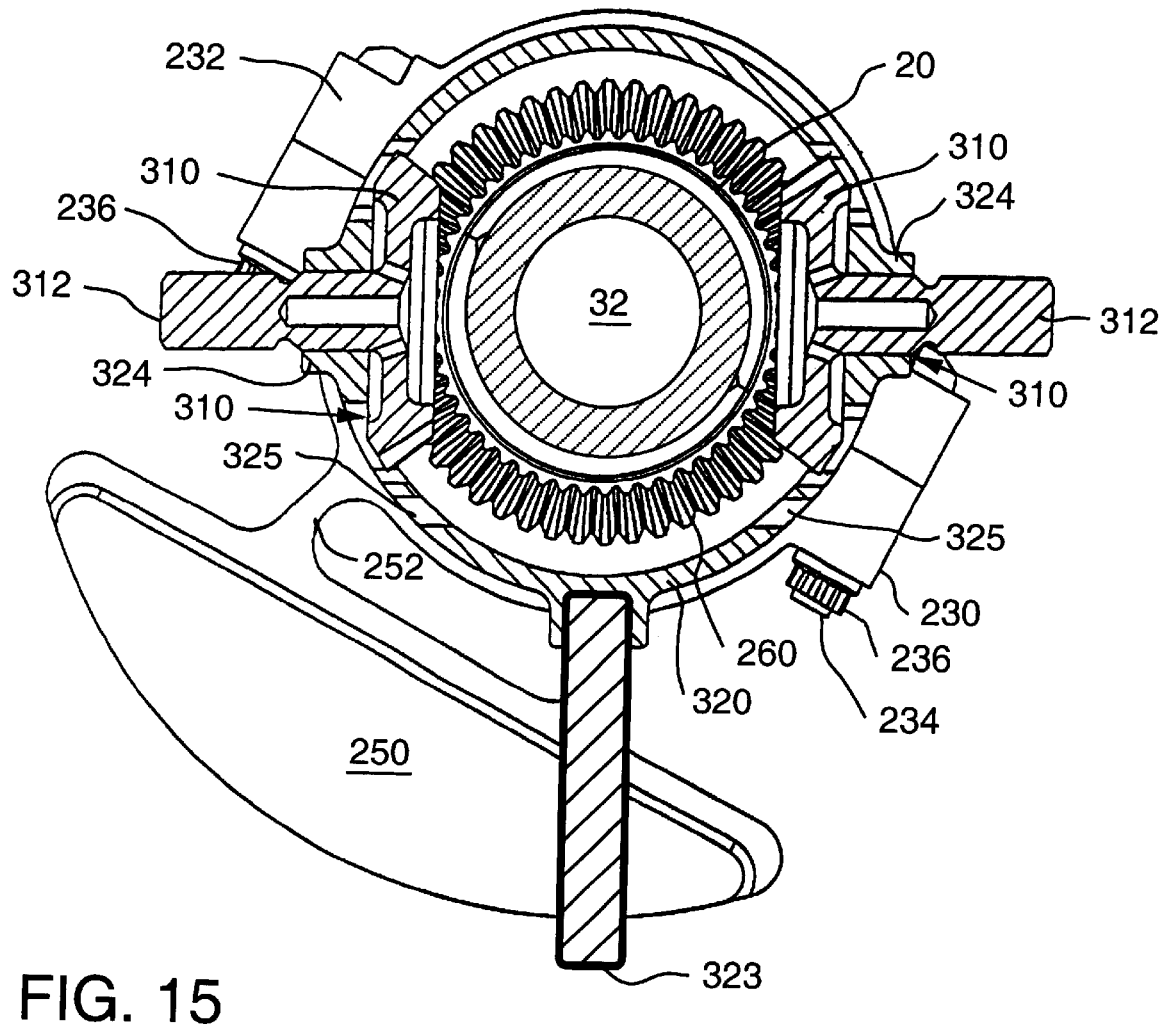
FIG. 15 is another cross-sectional view of the drive assembly of FIGS. 12–14 taken along line XV—XV in FIG. 12.

A secondary balance mass assembly 270 is rotatably and removably supported on the journal 36 of the crankshaft 20. The secondary balance mass assembly may be fabricated from steel or other suitable material and includes second cap portion 272 and a secondary hub portion 274 that are removably interconnectable to form a secondary balance mass carrier, generally designated as 280. As can be seen in FIG. 9, the secondary hub portion 272 may be removably affixed to the secondary cap 274 portion by, for example, mechanical fasteners such as bolts 276 and nuts 278. When attached together as shown in FIG. 9, the secondary hub portion 272 and the secondary cap portion 274 define a hole 282 in the secondary balance mass carrier 280 for receiving a portion of crankshaft journal 36 therein. In this embodiment, a commercially available planer bearing 284 is provided on the journal 36 and the hole 282 is sized to receive the planer bearing 284 therein to facilitate rotational travel of the secondary balance mass carrier 280 about the planer bearing 284. See FIG. 12. To further facilitate rotation of the planer bearing 284 on the journal 36, a radially extending lubrication passage 37 is preferably aligned with the planer bearing 284 as shown in FIG. 14 to deliver lubrication medium (i.e., liquid crankcase oil) between the planer bearing 284 and the journal 36. It will be appreciated that such construction enables the secondary balance mass assembly 270 to rotate about the crankshaft 20 while enabling that balance mass assembly 270 to be easily removed therefrom.

A secondary balance mass 290 is radially affixed to the secondary hub portion 272 by arms 292 that support the balance mass 290 apart from the secondary hub portion 272. The secondary balance mass 290 has a center of gravity (designated 294 in FIG. 9) that is a predetermined distance "E'" from the axis D'—D' (and axis A—A when the balance assembly 270 is coaxially supported on the journal 36 of the crankshaft 20). The secondary hub portion 272, balance arms 292, and the secondary balance mass 290 may be integrally formed from one piece of material. Those of ordinary skill in the art will appreciate that the secondary balance mass 290 may be provided in a variety of different shapes and weights.

Figure 11:
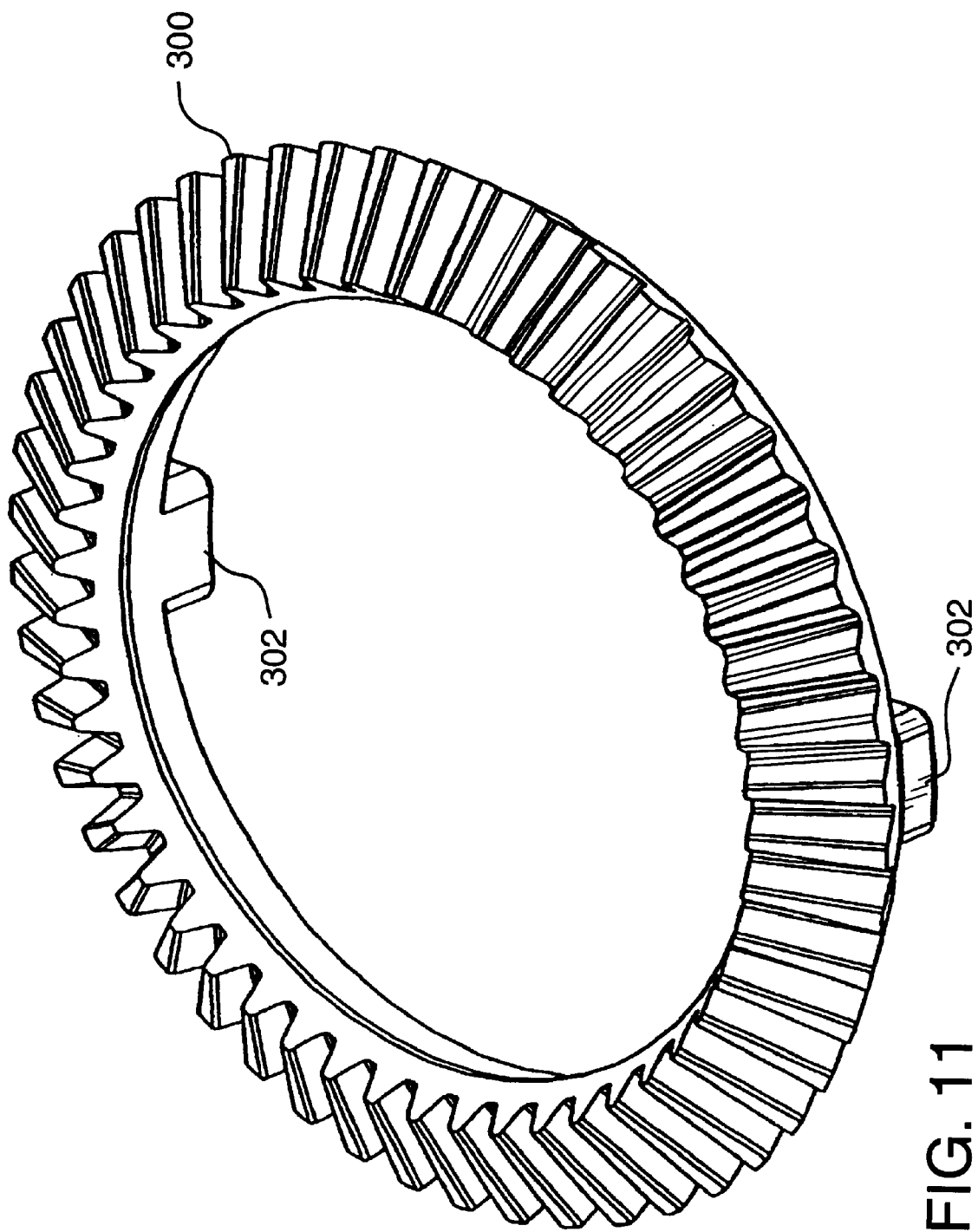
FIG. 11 is a perspective view of the secondary gear of the drive assembly of FIG. 5.

The secondary balance mass carrier 280 has a bearing surface 286 for receiving a second bevel gear 300. To facilitate easy replacement of the secondary bevel gear 300, the secondary bevel gear 300 is removably supported on the secondary bearing cap 280 by a pair of outwardly protruding tabs 302 that are formed on the rear surface of the secondary bevel gear 300. See FIG. 11. As can be seen in FIG. 9, a pair of cavities 288 are provided in the surface 286 of the secondary balance mass carrier 280 for receiving the tabs 302 therein. The reader will appreciate that such arrangement permits the secondary bevel gear 300 to be readily detached from the secondary balance mass carrier 280, yet the secondary bevel gear 300 is non-rotatably supported by the secondary balance mass carrier 280 such that rotation of the secondary bevel gear 300 causes the secondary balance mass carrier 280 to rotate with it.

The primary and secondary gears (260, 300) are intermeshed with at least one, and preferably two, auxiliary bevel gears 310 in a one-to-one ratio such that balance mass assemblies (220, 270) rotate at the same speed, but in different directions. Thus, in this embodiment, gears (260, 300, 310) are sized such that gear 300 will rotate at substantially the same speed as gear 260, except that gear 300 will rotate in an opposite direction.

Figure 12:
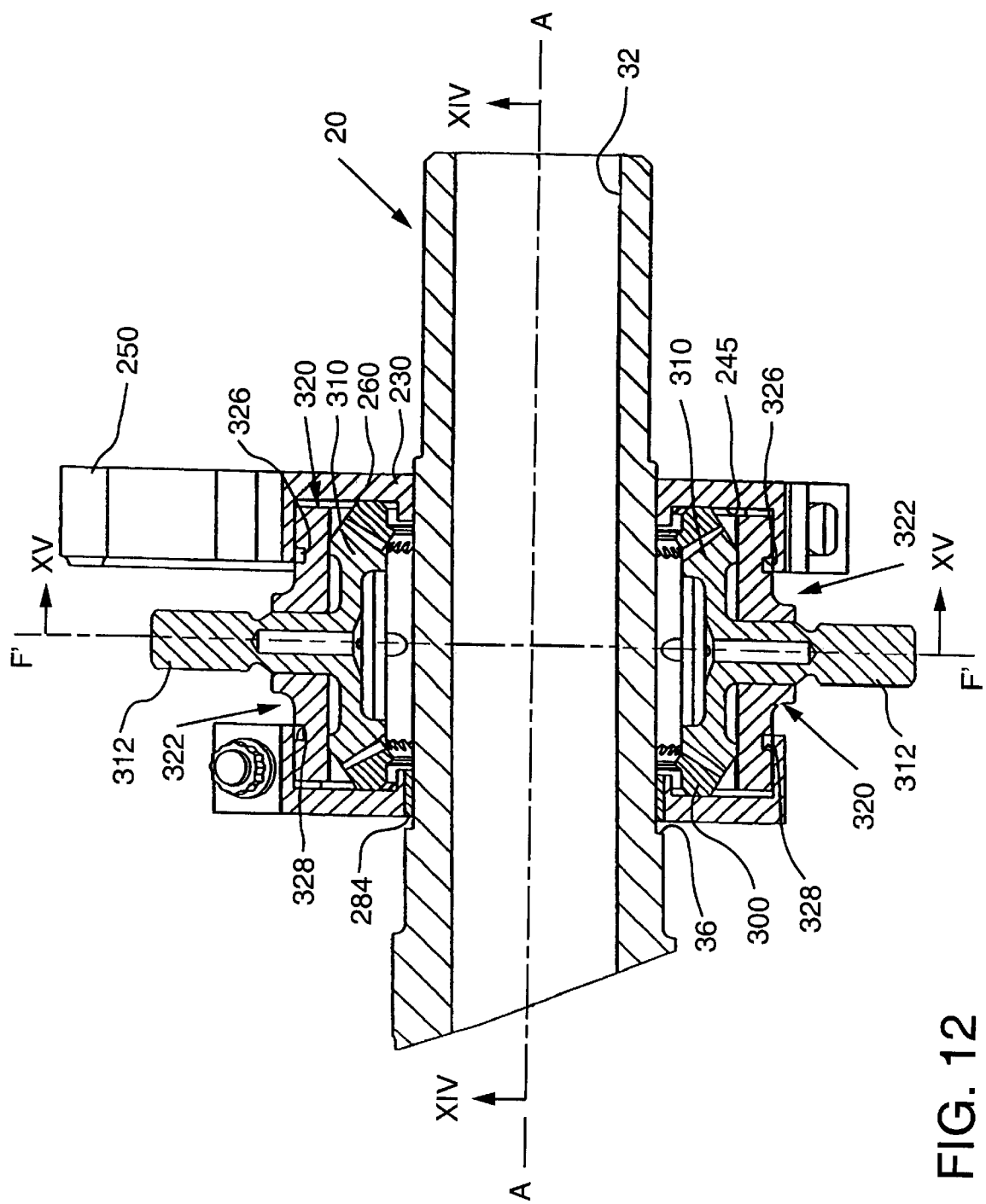
FIG. 12 is a cross-sectional view of the drive assembly of FIG. 5.

As can be seen in FIGS. 12–15, the auxiliary bevel gears 310 are retained between the primary and secondary gears (260, 300) in intermeshing engagement therewith by a gear cage assembly 320. Gear cage assembly 320 is preferably fabricated from steel or other suitable material and has two end portions 322 that are each adapted to rotatably support a corresponding auxiliary gear 310 along a common axis F'—F' as shown in FIG. 12. A commercially available bearing (not shown) may be pressed into the outwardly protruding shoulder portions 324 formed on each end 322 of the gear cage assembly 320 to facilitate rotatable support of the auxiliary bevel gears 310 relative to the gear cage assembly 320. Gear cage assembly 320 is also preferably configured to rotatably receive a portion of the crankshaft 20 therein such that the axis F'—F' is substantially transverse to the crankshaft axis A—A. See FIG. 12. In addition, in this embodiment, the gear cage assembly 320 is affixed to the engine housing 321 by a pin 323. Thus, the reader will appreciate that the gear cage 320 does not rotate with the crankshaft 20.

Figure 13:
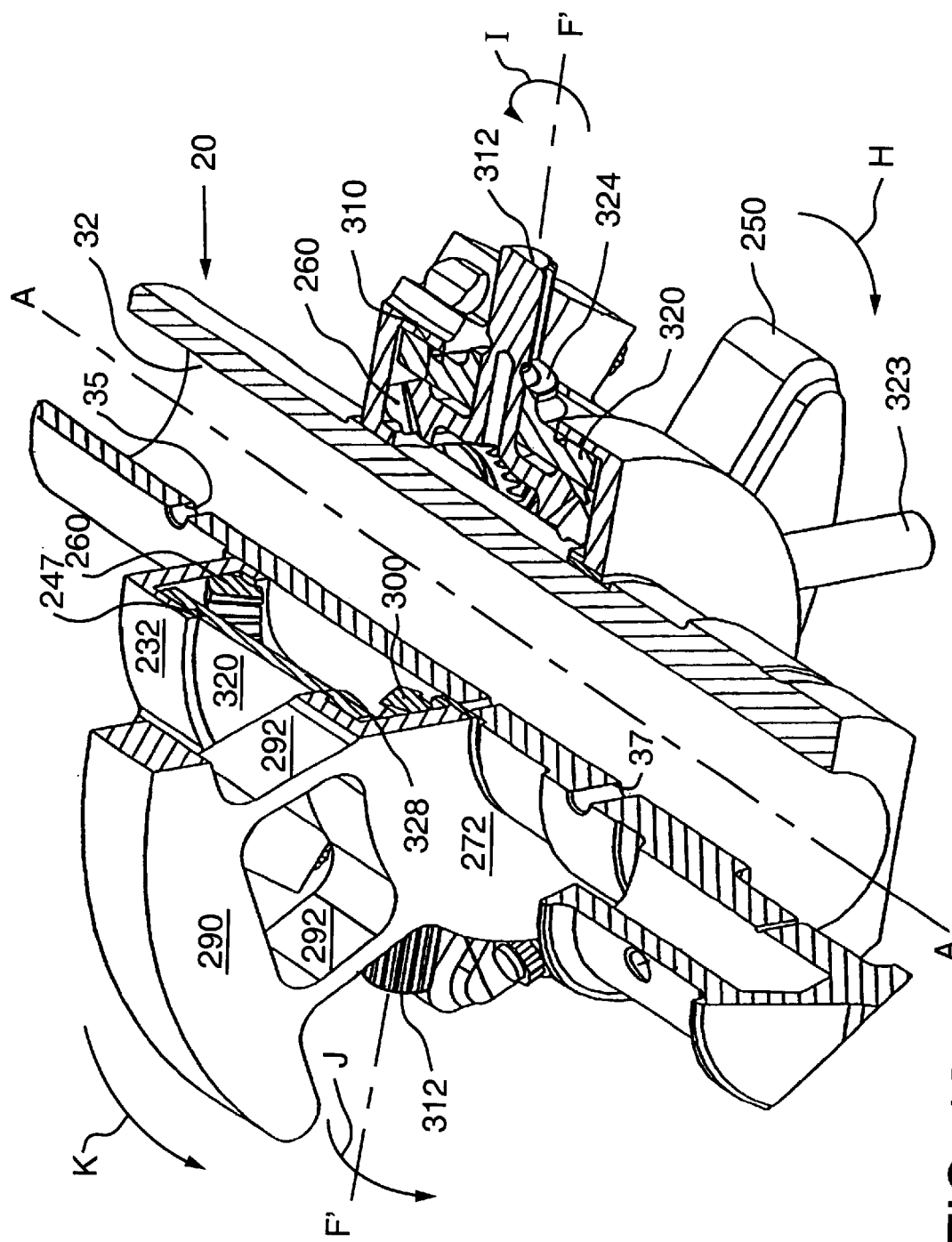
FIG. 13 is a partial cross-sectional perspective view of the drive assembly of FIG. 12.

As can be most particularly seen in FIGS. 12–14, a primary annular groove 326 is provided in the exterior of the gear cage 320. The primary hub portion 230 and the primary cap portion 232 each have a cavity 243 formed therein that cooperate to form a counterbore 245 in the primary balance mass carrier 240. See FIG. 7. Counterbore 245 is sized to receive a portion of the gear cage 320 therein as shown in FIG. 12. In addition, an annular lip portion 247 is formed on the primary hub portion 230 and is sized to be received within the primary annular groove 326 in the gear cage assembly. Similarly, another lip portion 249, is formed on the primary cap portion and the lip portion is also sized to be received in the primary annular groove 326 in the gear cage assembly 320. To facilitate easy assembly, the lip portions (247, 249) are sized such that they do not cooperate to form a continuous annular lip. However, such arrangement could conceivably be employed if so desired. Thus, as the primary balance mass assembly 220 is rotated, the lip portions (247, 249) ride in the primary annular groove 326 in the gear cage assembly 320.

Figure 10:
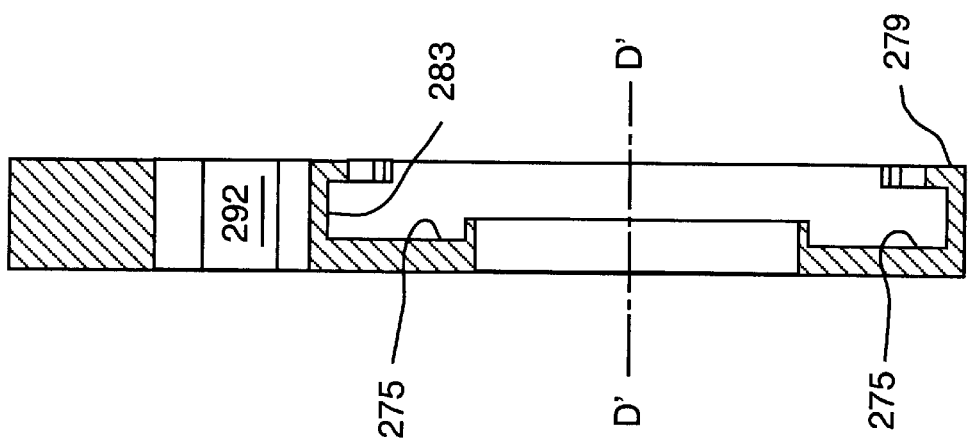
FIG. 10 is a cross-sectional view of the secondary balance mass assembly of FIG. 9 taken along line X—X in FIG. 9.

Similarly, a secondary annular groove 328 is provided in the exterior of the gear cage 320. The secondary hub portion 272 and the secondary cap portion 274 each have a cavity 275 formed therein that cooperate to form a counterbore 283 in the secondary balance mass carrier 280. See FIG. 10.

Counterbore 283 is sized to receive a portion of the gear cage 320 therein as shown in FIG. 12. In addition, an annular lip portion 277 is formed on the secondary hub portion 272 and is sized to be received within the secondary annular groove 328 in the gear cage assembly 320. Another lip portion 279 is formed on the secondary cap portion 274 and the lip portion 279 is also sized to be received in the secondary annular groove 328 in the gear cage assembly 320. To facilitate easy assembly, the lip portions (277, 279) are sized such that they do not cooperate to form a completely continuous annular lip when the secondary hub and secondary cap portions (272, 274) are attached together. However, such arrangement could conceivably be employed if so desired. Thus, as the secondary balance mass assembly 270 is rotated, the lip portions (277, 279) ride in the secondary annular groove 328 in the gear cage assembly 320.

The subject drive assembly 210 can also be most advantageously used to harness rotational power from the rotating crankshaft 20 and use that power to drive various auxiliary devices, such as, hydraulic pumps, vacuum pumps, etc. This may be accomplished by providing a splined shaft 312 on each auxiliary gear 310. The skilled artisan will appreciate that the splined shaft 312 enables the auxiliary gears 310 to be coupled to other auxiliary devices in a conventional manner. It will be further appreciated, however, that other methods of coupling the auxiliary gears 310 to an auxiliary device may be successfully employed. Those of ordinary skill in the art will also understand that the drive assembly 210 may also be fabricated with only one auxiliary gear 310.

As the crankshaft 20 rotates and a lubrication medium (i.e., crankcase oil) flows through the passage 32 in the crankshaft 20, crankcase oil will flow into the gear cage 320 through the passage 37 in the crankshaft 20. Thus, as the gears (260, 300, 310) rotate, they are partially immersed in a pool of oil. The level of the pool of oil is regulated to a desired depth by at least one, and preferably two holes 325 in the gear cage 320.

The installation of a drive assembly 210 onto the crankshaft 20 will now be described. The planer bearing 284 and the secondary bevel gear 300 are positioned on the crankshaft 20 as shown in FIG. 12. The gear cage assembly 320, complete with the auxiliary bevel gears 310, is slid onto the crankshaft 20 and affixed to the engine block or housing 321 by pin 323. See FIG. 29. The secondary bevel gear 300 is brought into intermeshing engagement with the auxiliary gear 310 and the secondary hub and secondary cap portions (272, 274) are placed around the planer bearing 284 and located such that the tabs 302 of the secondary gear 300 are received in the cavities 288 in the secondary balance mass carrier 280 and the lip portions (277, 279) are received in the secondary annular groove 328 in the gear cage 320. The bolts 276 and nuts 278 are tightened to affix the secondary hub and secondary cap portions (272, 274) together. The primary gear 260 is then positioned on the crankshaft 20 in meshing engagement with the other auxiliary bevel gear 310. The primary hub and primary cap portions (230, 232) are placed around the crankshaft 20 and are located such that the tabs 262 of the primary bevel gear 260 are received in the cavities 258 and that the lip portions (247, 249) are received in the primary annular groove 326 in the gear cage assembly 320.

The operation of the drive assembly 20 will now be described. As the crankshaft 20 rotates in a clockwise direction (represented by arrow "H" in FIG. 13), the primary gear 260 also rotates in that direction by virtue of being non-rotatably supported by the primary balance mass carrier 240 which is clamped to the crankshaft 20. As the primary gear 260 rotates, it causes the auxiliary gears 310 to rotate about axis F'—F' in the directions represented by arrows "I" and "J". The auxiliary gears 310, by virtue of their intermeshing engagement with the secondary bevel gear 300, causes the secondary balance mass assembly 270 (and the secondary balance mass 290) to rotate in the counterclockwise direction (represented by arrow "K" in FIG. 13) at substantially the same speed as the crankshaft 20. Thus, this embodiment operates in the manners described above. In addition, however, it will be appreciated that the thrust loads generated by the gears 310 are transferred directly to the gear cage 320. Likewise, the thrust loads from gears (260, 300) are transferred to the balance mass carriers (240, 280) by the surfaces (256, 287), respectively. Those loads are then transferred to the gear cage 320 by the lips (247, 249) on the balance mass carrier 240 and by lips (277, 279) on the balance mass carrier 280.

Figure 16:
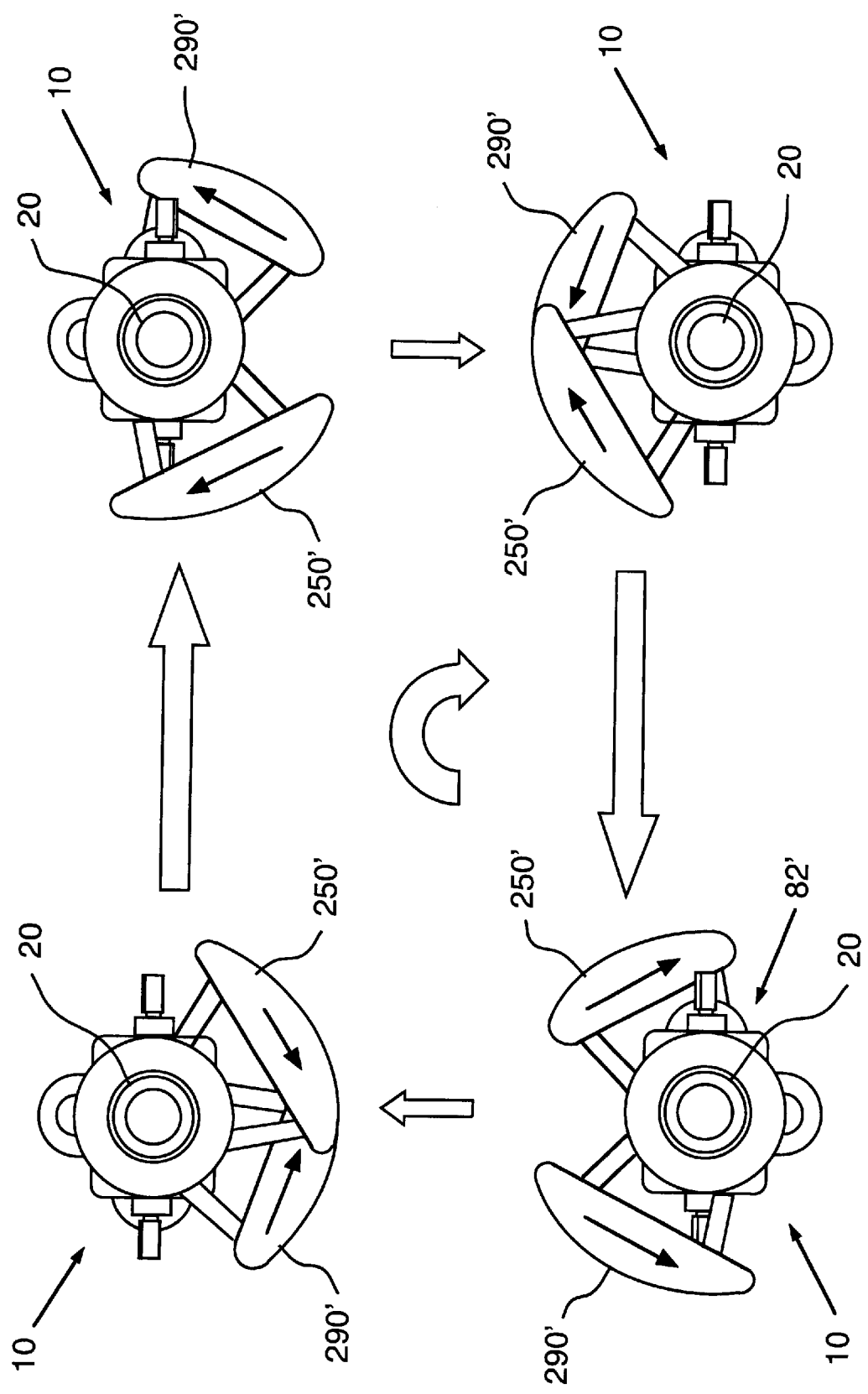
FIG. 16 is a collection of front end views of a rotating crankshaft having the balancing apparatus of the present invention attached thereto.

FIG. 16 illustrates the rotation of the balance masses (250', 290') of the present invention attached to the crankshaft 20. The engine with its 90° firing order has a primary shaking force and couple unbalanced based on the weight of the pistons and connecting rods, etc. as they move back and forth in the cylinder. That is, the engine shakes from side to side while it twists on its mounts in with a frequency equal to its engine speed. As the balance masses of the present invention rotate, they add and subtract from each other. This relationship may be gleaned from reference to FIG. 16.

The present balance mechanism is a compact and relatively lightweight means of countering the inertia force unbalance which is inherent in "even fire" two stroke engines with less than 12 cylinders and even fire four stroke engines with less than six cylinders. The skilled artisan will appreciate that the horizontally opposed, four cylinder, two stroke engine shown in FIG. 1 has an inherent primary force and couple unbalance. Such directly opposed engine, however, internally balances all secondary and higher inertia forces. Therefore, additional balancing apparatuses are generally not employed in such engines to counter such higher order forces. The subject invention balances the primary forces, primary couples and also the rotating unbalance of the crankshaft and connecting rods.

As described herein, the balance mass drive assemblies of the present invention are preferably coaxially affixed adjacent each end of the crankshaft. However, the drive assemblies may be positioned at other positions on the crankshaft. The balance masses that are essentially fixed to the crankshaft have a "total mass moment" (their mass times the radius of rotation of the balance mass center of gravity—i.e., distances "C'" and "E'") that is approximately equal to the rotating unbalance of the crankshaft and the connecting rods plus one half of the total reciprocating inertia times the crank radius. It will be understood that the "reciprocating inertia" is the mass of the pistons, rings, piston pins, oil entrained within the piston and other masses attached to the piston plus the effective reciprocating inertia of the connecting rod. The reciprocating inertia is generally approximated as one third the connecting rod weight. However, it will be appreciated by the skilled artisan that the reciprocating inertia may be more precisely determined by mathematical distribution of the connecting rod mass and moment of inertia to the effective crankpin and small end centers. In a preferred embodiment, the counter-rotating balance masses have a balance moment of approximately one half the reciprocating inertia times the crank radius. The precise mass-moment for the balancing masses may be calculated from the reciprocating inertia, the rotating mass moment, and the positioning of the balance masses on the crankshaft by using the equations set forth below.

In a preferred embodiment, the first balance masses are attached to the crankshaft in a desired position and the counter rotating balance masses are geared to the crankshaft in a desired timing scheme such that the mass moments add to each other to counteract and effectively cancel the reciprocating inertia of the pistons and associated parts in the plane of the cylinders. The timing and placement of the balance masses are arranged such that the forces of the balance masses counteract and effectively cancel each other in a plane perpendicular to the cylinders. The skilled artisan will also appreciate that, with the above-mentioned parameters in mind, the balance masses may also be advantageously positioned on the crankshaft to effectively cancel the inherent unbalanced couple of the reciprocating pistons.

Those of ordinary skill in the art will appreciate that the following empirical equations may be used in a known manner to calculate the various parameters described above. Such equations can be particularly advantageous in calculating such parameters for a four cylinder horizontally opposed, even fire, two stroke engine with two crank pins. The following equations are provided herein to illustrate the mechanics of the present invention which can be successfully applied to a variety of engine configurations.

Four Cylinder Opposed Engine Balance Analysis:
Glossary of terms:
R=crank radius
$\omega$=crankshaft velocity (radians/second)
$\theta$=crankshaft angle from reference number one top center
L=connecting rod length (center of crankpin to center of pin radius)
m=mass of piston and connection rod small end 1. Unbalanced Reciprocating Forces
Piston Acceleration in one bay of an opposed engine:

$$\frac{D_2 S}{Dt_2} \omega^2 R(\cos\theta + 4a_2\cos2\theta + 16a_4\cos4\theta + 36a_6\cos6\theta + \ldots )$$

Where:

$$a_2 = \frac{L}{R}\left[\frac{1}{4}\left(\frac{R}{L}\right)^2 + \frac{1}{16}\left(\frac{R}{L}\right)^4 + \frac{15}{512}\left(\frac{R}{L}\right)^6 + \ldots \right]$$

$$a_4 = \frac{-L}{R}\left[\frac{1}{64}\left(\frac{R}{L}\right)^4 + \frac{3}{256}\left(\frac{R}{L}\right)^6 + \ldots \right]$$

$$a_6 = \frac{L}{R}\left[\frac{1}{512}\left(\frac{R}{L}\right)^6 + \ldots \right]$$

Piston #1 (Piston #24):

$$\frac{D^2 S}{Dt^2} \omega^2 R(\cos\alpha + 4a_2\cos2\alpha + 16a_4\cos4\alpha + 36a_6\cos6\alpha + \ldots )$$

Piston #2 (Piston 25):

$$\frac{D^2 S}{St^2} = \omega^2 R[\cos(\alpha + \pi) + 4a_2\cos(2\alpha + 2\pi) + 16a_4\cos(4\alpha + 4\pi) + 36a_6\cos(6\alpha + 6\pi) + \ldots ] =$$
$$\omega^2 R[-\cos\alpha + 4a_2\cos2\alpha + 16a_4\cos4\alpha + 36a_6\cos6\alpha + \ldots ]$$

The combined reciprocating force for #1 crank (#1 piston (i.e., Piston 24) and #2 piston (i.e., Piston 25)):

$$\frac{D^2 S}{Dt^2} \omega^2 R(\cos\alpha + 4a_2\cos2\alpha + 16a_4\cos4\alpha + 36a_6\cos6\alpha + \ldots )$$
$$\omega^2 R[-\cos\alpha + 4a_2\cos2\alpha + 16a_4\cos4\alpha + 36a_6\cos6\alpha + \ldots ] = 2\omega^2 R\cos\alpha$$

This result shows that an opposed cylinder engine has only a first order reciprocating force on each crank. The secondary and higher orders are counteracted by the opposing cylinder. The unbalanced reciprocating force derived above can be represented by a rotating mass vector projected onto the cylinder plane. This rotating vector has a mass moment of $2w^2 R_0 m_0$ and is aligned with the cylinder centerline and rotates with the crankshaft.

2. Total reciprocating force for the combined crank #1 and crank #2:
Reciprocating force on crankpin #1:

$$F^1 = M_0 * \frac{D^2 S}{Dt^2}_{crank\ \#1} = 2m_0 * \omega^2 R_0\cos\alpha$$

Reciprocating force on crankpin #2:

$$F_2 = m_0 * \frac{D^2 S}{Dt^2}_{crank\ \#2} = 2m_0 * \omega^2 R_0\cos(\alpha - \pi) = 2m_0 * \omega^2 R_0\sin\alpha$$

Combining these two equations gives the total reciprocating force unbalance:

$F_r = F_1 + F_2 = 2m_0 R_0 * \omega^2 \cos\alpha + 2m_0 R_0 * \omega^2$ $\sin\alpha = 2m_0 R_0 * \omega^2[\cos\alpha + \sin$ $\alpha] = 2m_0 R_0 * \omega^2 * \sqrt{2}[\cos\alpha\cos$ $\pi/4 + \sin\alpha$ $\sin\pi/4] = 2\sqrt{2} m_0 R_0 \omega$ $^2[\cos(\alpha - \pi/4)]$ 3. Total combined reciprocating-induced couple for crankpin #1 and crankpin #2:

$$C_r = C_1 - C_2 + \frac{L_0}{2} 2m_0 R_0 * \omega^2[\cos\alpha - \sin\alpha]$$
$$= L_0 m_0 R_0 * \omega^2 \sqrt{2}\left[\cos\alpha\cos\frac{\pi}{4} - \sin\alpha\sin\frac{\pi}{4}\right]$$
$$= \sqrt{2} L_0 m_0 R_0 * \omega^2\left[\cos\left(\alpha + \frac{\pi}{4}\right)\right]$$

4. Balance masses to balance the reciprocating force:
Forward balance mass fixed to the crankshaft:

$f_{11} = m_b R_b * \omega^2 \cos(\alpha + \pi - \pi/4) = m_b R_b * \omega^2 \cos(\alpha - \pi/4)$ Forward balance mass counter rotating to the crankshaft:

$f_{12} = m_b R_b * \omega^2 \cos(\alpha\pi + \pi + \pi/4) = m_b R_b * \omega^2 \cos[-(\alpha - \pi - \pi/4)] = -m_b R_b * \omega^2 \cos(\alpha - \pi/4)$ Rear balance mass fixed to the crankshaft:

$f_{21} = m_b R_b * \omega^2 \cos(\alpha + \pi - \pi/4) = -m_b R_b * \omega^2 \cos(\alpha - \pi/4)$ Rear balance mass counter rotating to the crankshaft:

$f_{22} = m_b R_b * \omega^2 \cos(-\alpha + \pi + \pi/4) = m_b R_b * \omega^2 \cos[-(\alpha\pi - \pi/4)] = -m_b R_b * \omega^2 \cos(\alpha - \pi/4)$ The total force generated by those four rotating balance masses will be:

$$F_b = \sum_{i,j=1}^{2} f_{ij} = -4 * m_b R_b * \omega^2 \cos(\alpha - \pi/4)$$

To balance the reciprocating force set:

$$F_b + F_r = 0$$

i.e.

$$4 * m_b R_b * \omega^2 \cos(\alpha - \pi/4) - 2\sqrt{2} * m_0 R_0 * \omega^2 \cos(\alpha - \pi/4) = 0$$

Therefore:

$$m_b R_b \sqrt{2}/2 * m_0 R_0 = 0.7071 * m_0 R_0$$

5. Balance mass to balance the reciprocating force induced couple:

Forward balance mass fixed to the crankshaft:

$$c_{11} = L_c m_c R_b * \omega^2 \cos(\alpha + \pi + \pi/4) = -L_c m_c R_b * \omega^2 \cos(\alpha + \pi/4)$$

Forward balance mass counter-rotating to the crankshaft:

$$c_{12} = L_c m_c R_b * \omega^2 \cos(-\alpha + \pi - \pi/4) = -L_c m_c R_b * \omega^2 \cos(\alpha + \pi/4)$$

Rear balance mass fixed to the crankshaft:

$$c_{21} = L_c m_c R_b * \omega^2 \cos(\alpha + \pi/4)$$

Rear balance mass counter-rotating to the crankshaft:

$$c_{22} = L_c m_c R_b * \omega^2 \cos(-\alpha + \pi/4) = L_c m_c R_b * \omega^2 \cos(\alpha + \pi/4)$$

The total couple generated by those four rotating balance masses will be:

$$c_b = \sum_{i=1}^{2} C_{1i} - \sum_{i=1}^{2} c_{2i} = -4 * L_c m_c R_b * \omega^2 \cos(\alpha + \pi/4)$$

To balance those reciprocating-induced couples, set:

$$C_b + C_r = 0$$

i.e.

$$4 * L_c M_c R_b * \omega^2 \cos(\alpha + \pi/4) - \sqrt{2} * L_0 m_0 R_0 * \omega^2 \cos(\alpha + \pi/4) = 0$$

Therefore:

$$m_c R_b = \sqrt{2}/4 * \frac{L_0}{L_c} m_0 R_0$$

6. Combined four-piece rotating masses to balance the reciprocating force and couple: Set $m_t$ to be the mass either fixed to the crankshaft or counter-rotating to the crankshaft each with an arm length of $R_b$. These masses are to balance both the reciprocating inertia force and couple.

$$m_t R_b = \sqrt{(m_b R_b)^2 + (m_c R_b)^2} = \sqrt{\left(\left(\sqrt{2}/2 * m_0 R_0\right)^2 + 0.3536 * L_0/L_c * m_0 R_0\right)^2}$$

To calculate the angle between the vector of this mass with that of the $m_b R_b$:

$$\phi = \tan^{-1} \frac{m_c R_b}{m_b R_b} = \tan^{-1} \frac{0.3536 * L_0/L_c * m_0 R_0}{\sqrt{2}/2 * m_0 R_0} = \tan^{-1}(0.5 * L_0/L_c)$$

7. Rotating masses fixed to crankshaft to balance the piston induced rotating force and couple:

Centrifugal force for the first crank:

$$F_{r1} = m_r R_0 * \omega^2 \cos \alpha$$

Setting two pieces of rotating mass fixed to the crankshaft to balance both the force and couple, the forces generated by those two masses must satisfy:

Force balance:

$$f_{b11} + f_{b21} = F_{r1}$$

And couple balance:

$$f_{b11} L_1 + f_{b21} L_2$$

Therefore:

$$f_{b11} = F_{r1} * \frac{L_2}{L_1 + L_2}$$

$$f_{b21} = F_{r1} * \frac{L_1}{L_1 + L_2}$$

Considering:

$$F_r = m_r R i * \omega^2 \cos \alpha$$

There is:

$$m_{b11} = \frac{R_0}{R_b} * \frac{L_2}{L_1 + L_2} m_r$$

$$m_{b21} = \frac{R_0}{R_b} * \frac{L_1}{L_1 + L_2} m_r$$

By the same reasoning, the following equations can be derived for the second crankpin:

$$m_{b12} = \frac{R_0}{R_b} * \frac{L_1}{L_1 + L_2} m_r$$

$$m_{b22} = \frac{R_0}{R_b} * \frac{L_2}{L_1 + L_2} m_r$$

To combine the two fixed reciprocating balance masses and the two fixed rotating unbalance masses into just two masses:

$$m_{b1} R_b = \sqrt{m_{b11}^2 + m_{b12}^2} =$$

$$m_1 R_0 * \frac{\sqrt{-L_1^2 + L_2^2}}{L_1 + L_2} = m_r R_0 * \frac{\sqrt{(L_C - 0.5 * L_0)^2 - (L_C + 0.5 * L_0)^2}}{(L_C - 0.5 * L_0) + (L_C + 0.5 * L_0)} =$$

$$\sqrt{0.5 + 0.125 * (L_0/L_C)^2} * m_r R_0$$

$$m_{b2} R_b = \sqrt{m_{b21}^2 + m_{b22}^2} = m_r R_0 * \frac{\sqrt{L_1^2 + L_2^2}}{L_1 + L_2} =$$

$$\sqrt{0.5 + 0.125 * (L_0/L_c)^2} * m_r R_0$$

The vector angle of these forces to that of the $(-F_n)$ is:

$$\phi_{rot} = \tan^{-1}\frac{m_{b12}}{m_{b11}} = \tan^{-1}\frac{L_1}{L_2} = \tan^{-1}\frac{L_c - 0.5 * L_0}{L_c + 0.5 * L_0}$$

FIGS. 17 and 18 are graphical depictions of a crankshaft illustrating the positions of the balance masses for the embodiment described above. As can be seen in those Figures, the pistons (24, 25) in the first bank 14 are arranged about axis A—A at 90° relative to each other. FIG. 18 is an instantaneous snap shot of the rear crank throw when the pistons are at "top dead center". The total reciprocating forces "F Recip." are located at an approximately 45° angle between the pistons (24, 25) and (27, 28). Likewise, the total reciprocating couple force "C Recip." is located 90° from the F Recip. The balance masses (250 and 250') that are affixed to the crankshaft are located approximately 17.4° on each side of the force vector of F Recip. Similarly, the counter rotating balance masses (122, 122') are located approximately 17.4° on each side of the force vector C Recip.

Figure 19:
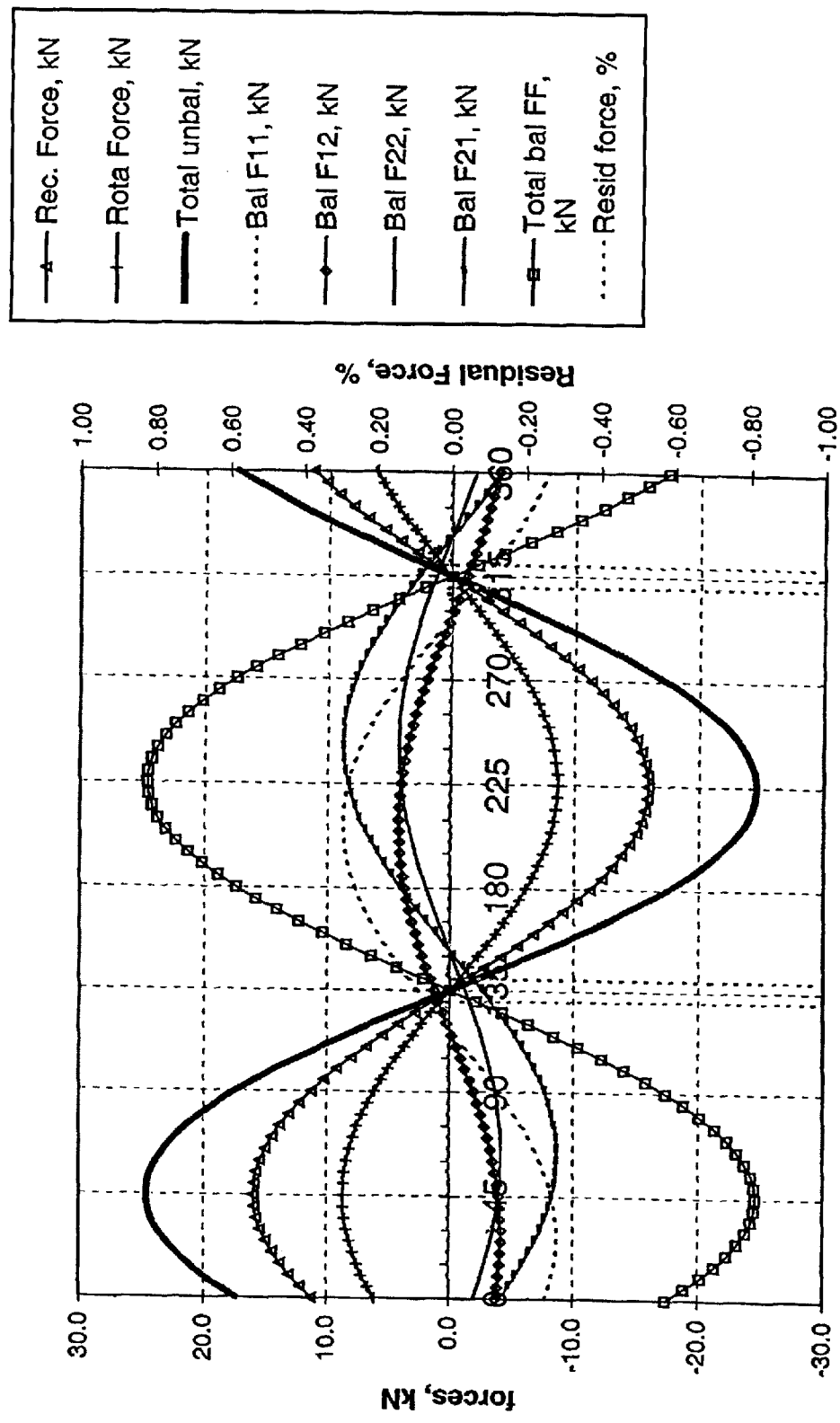
FIG. 19 is a graphical depiction of those reciprocating and rotational forces generated within the engine and those balancing forces generated by the present invention to counteract such reciprocating and rotational forces.
Figure 20:
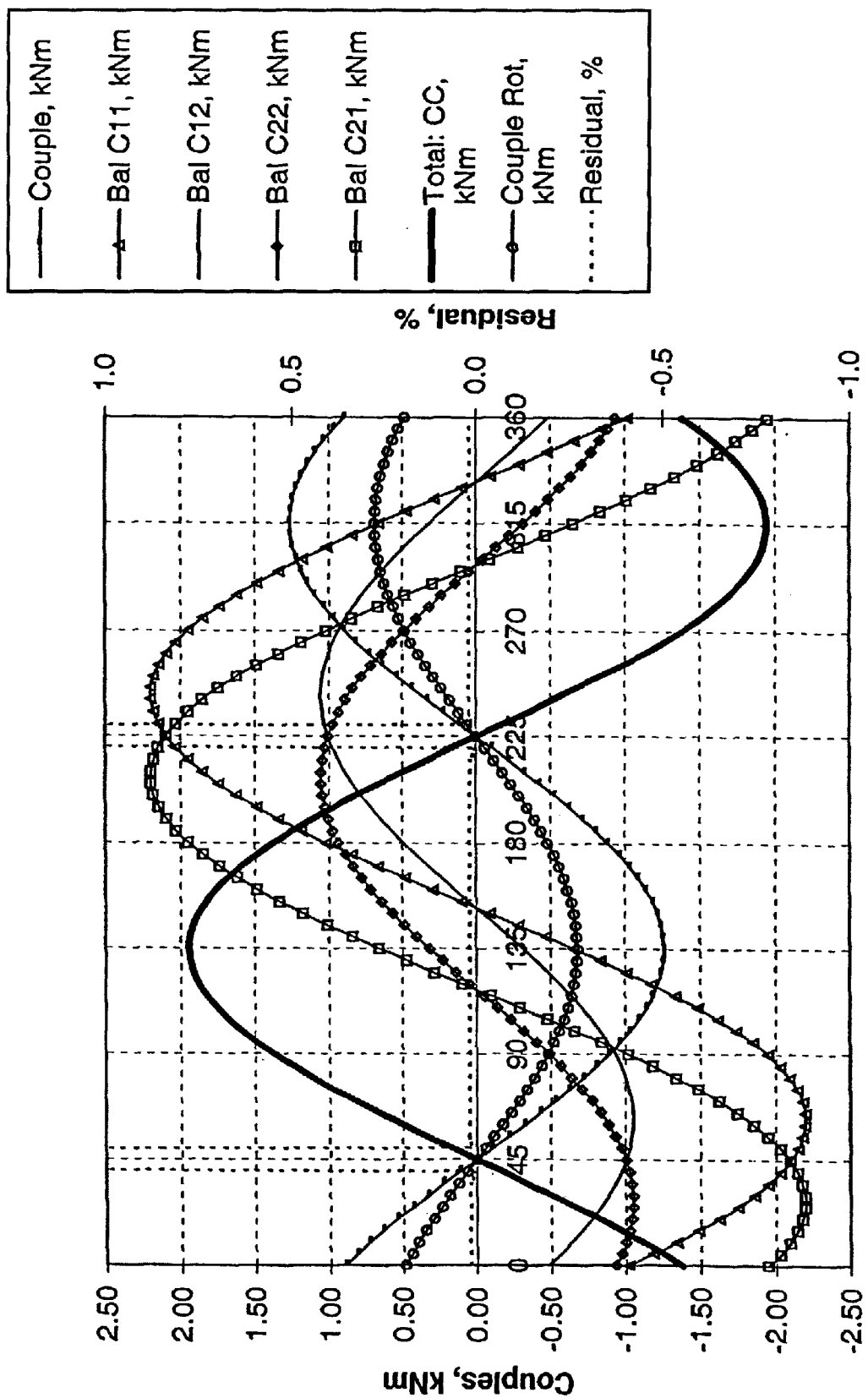
FIG. 20 is a graphical depiction of those couple forces generated within the engine and the balancing forces generated by the present invention to counteract such couple forces.

FIGS. 19 and 20 are additional graphical representations of the present invention's ability to effectively balance reciprocating and rotating forces and couples. More specifically, FIG. 19 is a graphical depiction of the various reciprocating and rotational forces generated by each cylinder and by the balance masses of the present invention. The reader will appreciate that:

"Bal F11"=The reciprocating force generated by the first piston 24 in the first bay 14;

"Bal F12"=The reciprocating force generated by the second piston 25 in the first bay 14;

"Bal F22"=The reciprocating force generated by the second piston 28 in the second bay 16;

"Bal F21"=The reciprocating force generated by first piston 27 in the second bay 16;

"Rec. Force"=The total reciprocating forces (unbalanced) generated in both bays (14, 16);

"Rota Force"=The total rotational forces (unbalanced) generated by the pistons;

"Total unbal"=The total unbalance forces within the engine (i.e., total unbalanced reciprocating forces+the total unbalanced rotational forces);

"Total bal FF"=The total forces generated by the balance masses (88, 88' 122, 122') of the present invention; and "Resid force"=The remaining or residual amount of forces remaining when the balance masses forces cancel (i.e., balance) the total unbalanced forces.

Thus, as can be seen from FIG. 19, there is very little residual reciprocating and rotational forces remaining in the engine after the balance masses have been added in accordance with the present invention.

FIG. 20 is a graphical depiction of the couple forces generated within the engine 12 wherein:

"Couple"=The total couple forces generated from the reciprocating forces within the engine bays;

"Bal C11"=The couple created by balance mass 88';

"Bal C12"=The couple generated by the balance mass 122';

"Bal C22"=The couple generated by balance mass 122;

"Bal C21"=The couple generated by balance mass 88;

"Total CC"=(C22+C21)−(C11+C12);

"Couple Rot"=Total couples generated from the rotational forces within the engine;

"Residual"=(Couple+TotalCC+CoupleRot)/(Couple+Total Recip. )*100. Therefore, as can be seen from FIG. 18, after applying the balance masses in accordance with the present invention, the remaining couple forces within the engine are very small.

The skilled artisan will appreciate that the timing and placement of the balance masses re designed such that the forces of the balance masses counteract and effectively cancel each other in a plane perpendicular to the cylinders. There is essentially an infinite choice in the particulars of the timing and positioning of the balance masses for balancing the reciprocating inertia and vertical forces. The balance masses of the subject invention are also arranged to balance the inherent unbalanced couple of the reciprocating pistons.

Thus, from the foregoing discussion, it is apparent that the present invention has many advantages over the prior apparatuses and methods employed to balance various forces within an engine. By mounting the balance masses coaxial with the crankshaft, less space is occupied by those members within the engine. Such coaxial arrangement of the balance masses also enable larger swing radiuses of the balance masses to be employed when compared to prior arrangements. The weight required for the balancing masses is inversely proportional to the radius of swing thereof. Thus, the unique mounting arrangement for the balancing masses of the present invention enable smaller balancing masses to be employed. Also, by coaxially mounting the balancing masses directly to the crankshaft, those rotating masses tend to act directing on the crankshaft which can lead to a reduction of the bearing forces, crankcase forces, and vibration generated when compared to a conventional arrangement that utilizes balance weights mounted to separate shafts within the engine. In such conventional methods, the unbalanced forces are transmitted through the engine bearings to the crank case. That is, the balancing shaft balancing forces are transmitted through the bearings of the two balance shafts into the crankcase where they combine with and cancel the unbalanced forces from the crankshaft. In the present invention, the unbalanced and balanced forces act directly on the crankshaft with the force cancellation occurring within the crankshaft. Little or no unbalance or countering balance force is transmitted to the crankcase. Thus, engine bearings can be made smaller which leads to a light and less costly engine. Also, by coaxially mounting the balance masses to the crankshaft, the need for additional counterweight shaft arrangements employed in prior balance arrangements are not required. Therefore, the present invention can result in a lighter more compact engine.

In addition, the present invention represents unique and novel apparatus for solving the above-mentioned problems that is readily detachable from the crankshaft. Disassembly is required for component replacement and inspection. In addition, such arrangement permits the bevel gears to be supported by a cage pilot arrangement. Moreover, such apparatus permits the thrust loads to be handled by the balance assembly itself, instead of such loads being applied directly to the crankshaft. Such arrangement also provides for the lubrication of the balance assembly gears. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. Balancing apparatus for an engine having a rotating crankshaft that has a crankshaft axis, said balancing apparatus comprising:

a primary balance mass assembly non-rotatably and removably affixed to the crankshaft, wherein said primary balance mass assembly comprises:
  a primary mass affixed to a primary hub portion; and
  a primary cap portion removably affixed to said primary hub portion to clamp a portion of the crankshaft therebetween;
a secondary balance mass assembly rotatably and removably supported on the crankshaft; and
a driver attached to the crankshaft for causing said secondary balance mass assembly to rotate in a direction opposite to the direction of rotation of the crankshaft.

2. The balancing apparatus of claim 1 wherein said secondary balance mass assembly comprises:
  a secondary mass affixed to a secondary hub portion; and
  a secondary cap portion removably affixed to said secondary hub portion to define a second hole therebetween to rotatably receive a portion of the crankshaft therein.

3. The balancing apparatus of claim 1 further comprising a key-receiving slot in one of said primary hub and primary cap portions for receiving a locating key protruding from a portion of the crankshaft.

4. The balancing apparatus of claim 2 further comprising a sleeve bearing received between said secondary cap and secondary hub portions and the crankshaft.

5. Balancing apparatus for an engine having a rotating crankshaft that has a crankshaft axis, said balancing apparatus comprising:
  a primary balance mass assembly non-rotatably and removably affixed to the crankshaft, wherein said primary balance mass assembly comprises:
    a primary mass affixed to a primary hub portion; and
    a primary cap portion removably affixed to said primary hub portion to clamp a portion of the crankshaft therebetween, wherein said primary cap and primary hub portions form a primary balance mass carrier;
  a secondary balance mass assembly rotatably and removably supported on the crankshaft, wherein said secondary balance mass assembly comprises:
    a secondary mass affixed to a secondary hub portion; and
    a secondary cap portion removably affixed to said secondary hub portion to clamp a portion of the crankshaft therebetween, and wherein said secondary cap and secondary hub portions form a secondary balance mass carrier;
  a driver attached to the crankshaft for causing said secondary balance mass assembly to rotate in a direction opposite to the direction of rotation of the crankshaft, said driver comprising:
    a primary gear non-rotatably supported by said primary balance mass carrier;
    a secondary gear non-rotatably supported by said secondary balance mass carrier and drivingly communicating with said primary gear such that rotation of the crankshaft in a primary direction causes said secondary gear and said secondary balance mass assembly to rotate about the crankshaft in a secondary rotational direction opposite to said primary rotational direction.

6. The balancing apparatus of claim 5 wherein said primary balance mass carrier has a pair of first cavities therein for receiving corresponding first tabs protruding from said primary gear.

7. The balancing apparatus of claim 5 wherein said secondary balance mass carrier has a pair of second cavities therein for receiving corresponding second tabs protruding from said secondary gear.

8. The balancing apparatus of claim 5 further comprising:
  at least one auxiliary gear in intermeshing engagement with said primary and secondary gears;
  a gear cage supportable on the crankshaft, said gear cage supporting said auxiliary gears therein;
  a primary annular groove in said gear cage;
  a primary lip portion on said primary balance mass carrier and being slidably received in said primary annular groove;
  a secondary annular groove in said gear cage; and
  a secondary lip portion on said secondary balance mass carrier and being slidably received in said secondary annular groove.

9. The balancing apparatus of claim 7 wherein said gear cage has a lubricating medium therein.

10. The balancing apparatus of claim 9 wherein said lubricating medium comprises a liquid and wherein said gear cage has means for maintaining said liquid at a predetermined level within said gear cage.

11. The balancing apparatus of claim 10 wherein said means for maintaining comprises a pair of opposing lubricating holes in said gear cage.

12. An engine balance mechanism, comprising:
  a crankshaft defining a shaft axis;
  a primary balance mass carrier removably and non-rotatably attached to said crankshaft and having a primary balance mass thereon, wherein said primary balance mass carrier comprises:
    a primary hub portion; and
    a primary cap portion removably affixed to said primary hub portion to clamp a portion of the crankshaft therebetween;
  a secondary balance mass carrier rotatably and removably received on said crankshaft and having a secondary balance mass thereon;
  a primary gear removably supported on said primary balance mass carrier;
  a secondary gear removably supported on said secondary balance mass carrier;
  at least one auxiliary gear in intermeshing engagement with said primary and secondary gears; and
  a gear cage coaxially supported on said crankshaft and supporting said auxiliary gears therein.

13. The balancing apparatus of claim 12 wherein said secondary balance mass carrier comprises:
  a secondary hub portion; and
  a secondary cap portion removably affixed to said secondary hub portion to define a second hole therebetween to rotatably receive a portion of the crankshaft therein.

14. The balancing apparatus of claim 12 wherein said primary balance mass carrier has a pair of primary cavities therein for receiving corresponding primary tabs protruding from said primary gear.

15. The balancing apparatus of claim 12 wherein said secondary balance mass carrier has a pair of secondary cavities therein for receiving corresponding secondary tabs protruding from said secondary gear.

16. The balancing apparatus of claim 12 further comprising:

a primary annular groove in said gear cage;

a primary lip portion on said primary balance mass carrier, said primary lip portion slidably received in said primary annular groove;

a secondary annular groove in said gear cage; and a secondary lip portion on said secondary balance mass carrier, said secondary lip portion slidably received in said secondary annular groove.

17. The balancing apparatus of claim 12 wherein said gear cage has a lubricating medium therein.

18. The balancing apparatus of claim 17 wherein said lubricating medium comprises a liquid and wherein said gear cage has means for maintaining said liquid at a predetermined level within said gear cage.

19. The balancing apparatus of claim 18 wherein said means for maintaining comprises a pair of opposing lubricating holes in said gear cage.

20. An internal combustion engine, comprising:

a rotatably supported crankshaft;

a plurality of pistons operably supported within the engine and affixed to said crankshaft for causing said crankshaft to rotate in a primary direction;

a primary balance mass carrier removably and non-rotatably attached to said crankshaft and having a primary balance mass thereon, wherein said primary balance mass carrier comprises:

a primary hub portion; and a primary cap portion removably affixed to said primary hub portion to clamp a portion of the crankshaft therebetween;

a secondary balance mass carrier rotatably and removably received on said crankshaft and having a secondary balance mass thereon, wherein said secondary balance mass carrier comprises:

a secondary hub portion; and a secondary cap portion removably affixed to said secondary hub portion to define a second hole therebetween to rotatably receive a portion of the crankshaft therein; and a driver attached to said crankshaft for causing said secondary balance mass assembly to rotate in a direction opposite to said first direction.

\* \* \* \* \*

UNITED STATES PATENT AND TRADEMARK OFFICE
CERTIFICATE OF CORRECTION

PATENT NO. : 6,427,657 B1
DATED : August 6, 2002
INVENTOR(S) : Egleston, Robert W.

It is certified that error appears in the above-identified patent and that said Letters Patent is hereby corrected as shown below:

Column 1,
Lines 30-31, delete "This need almost universally encompasses all types of engine designs the engine's cycle."

Signed and Sealed this

Eleventh Day of February, 2003

JAMES E. ROGAN
*Director of the United States Patent and Trademark Office*